United States Patent
Goodstein

(10) Patent No.: US 11,035,511 B2
(45) Date of Patent: Jun. 15, 2021

(54) QUICK-CHANGE END EFFECTOR

(71) Applicant: DIVERGENT TECHNOLOGIES, INC., Los Angeles, CA (US)

(72) Inventor: Kenneth James Goodstein, Acton, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 16/000,137

(22) Filed: Jun. 5, 2018

(65) Prior Publication Data
US 2019/0368643 A1    Dec. 5, 2019

(51) Int. Cl.
| | |
|---|---|
| *F16L 37/62* | (2006.01) |
| *B05B 1/22* | (2006.01) |
| *B23K 26/354* | (2014.01) |
| *F16L 21/08* | (2006.01) |
| *B23K 26/34* | (2014.01) |
| *B33Y 80/00* | (2015.01) |
| *B33Y 10/00* | (2015.01) |
| *B22F 10/20* | (2021.01) |

(52) U.S. Cl.
CPC ............ *F16L 37/62* (2013.01); *B05B 1/22* (2013.01); *B23K 26/34* (2013.01); *B23K 26/354* (2015.10); *B33Y 80/00* (2014.12); *F16L 21/08* (2013.01); *B22F 10/20* (2021.01); *B33Y 10/00* (2014.12)

(58) Field of Classification Search
CPC . F16L 37/62; F16L 21/08; B05B 15/65; B25J 15/0441; B25J 15/0425; B25J 15/0408; B25J 15/0433
See application file for complete search history.

(56) References Cited

U.S. PATENT DOCUMENTS

| | | | |
|---|---|---|---|
| 4,995,333 A | * | 2/1991 | Keller ............... B05C 5/02 |
| | | | 118/300 |
| 5,203,226 A | | 4/1993 | Hongou et al. |
| 5,742,385 A | | 4/1998 | Champa |
| 5,990,444 A | | 11/1999 | Costin |
| 6,010,155 A | | 1/2000 | Rinehart |
| 6,096,249 A | | 8/2000 | Yamaguchi |

(Continued)

FOREIGN PATENT DOCUMENTS

CN    206870375 U    1/2018

OTHER PUBLICATIONS

US 9,202,136 B2, 12/2015, Schmidt et al. (withdrawn)
(Continued)

*Primary Examiner* — Timothy P. Kelly
(74) *Attorney, Agent, or Firm* — Arent Fox LLP

(57) ABSTRACT

An end effector for interfacing with a nozzle is disclosed. The end effector comprises a first end, which includes a receptacle. The end effector comprises one or more retention features positioned along a perimeter of the receptacle, where each of the one or more retention features is movable between a first position and a second position. Each of the one or more retention features is configured to lock the nozzle by securing onto a corresponding one of the one or more nozzle retention features in the first position, and to release the nozzle in the second position. The end effector may further comprise one or more actuators and a first channel, which includes a first inlet and a first outlet. A method of using an end effector to interface with a nozzle is also disclosed.

36 Claims, 20 Drawing Sheets

(56) References Cited

U.S. PATENT DOCUMENTS

| | | | |
|---|---|---|---|
| 6,140,602 A | 10/2000 | Costin | |
| 6,210,141 B1 | 4/2001 | Allen | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,619,566 B2* | 9/2003 | Gressett, Jr. | B05B 7/0861 |
| | | | 239/296 |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,399,361 B2* | 7/2008 | de Leeuw | B05C 5/02 |
| | | | 118/300 |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,073,267 B1 | 7/2015 | Badgley et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |
| 9,829,564 B2 | 11/2017 | Bruder et al. | |
| 9,846,933 B2 | 12/2017 | Yuksel | |
| 9,854,828 B2 | 1/2018 | Langeland | |
| 9,858,604 B2 | 1/2018 | Apsley et al. | |

(56) References Cited

U.S. PATENT DOCUMENTS

| | | |
|---|---|---|
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |

(56) References Cited

U.S. PATENT DOCUMENTS

| | | |
|---|---|---|
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2010/0183763 A1 | 7/2010 | Babin et al. |
| 2014/0277669 A1 | 9/2014 | Nardi et al. |
| 2016/0339470 A1* | 11/2016 | MacIndoe ............ B05C 5/0225 |
| 2017/0001368 A1 | 1/2017 | Czinger et al. |
| 2017/0072614 A1 | 3/2017 | Lind et al. |
| 2017/0113344 A1 | 4/2017 | Schönberg |
| 2017/0266876 A1 | 9/2017 | Hocker |
| 2017/0341309 A1 | 11/2017 | Piepenbrock et al. |
| 2018/0065320 A1 | 3/2018 | Tyler |

OTHER PUBLICATIONS

US 9,809,265 B2, 11/2017, Kinjo (withdrawn)
US 10,449,880 B2, 10/2019, Mizobata et al. (withdrawn)
International Search Report & Written Opinion received in PCT/US2019/033802 dated Aug. 8, 2019.

\* cited by examiner

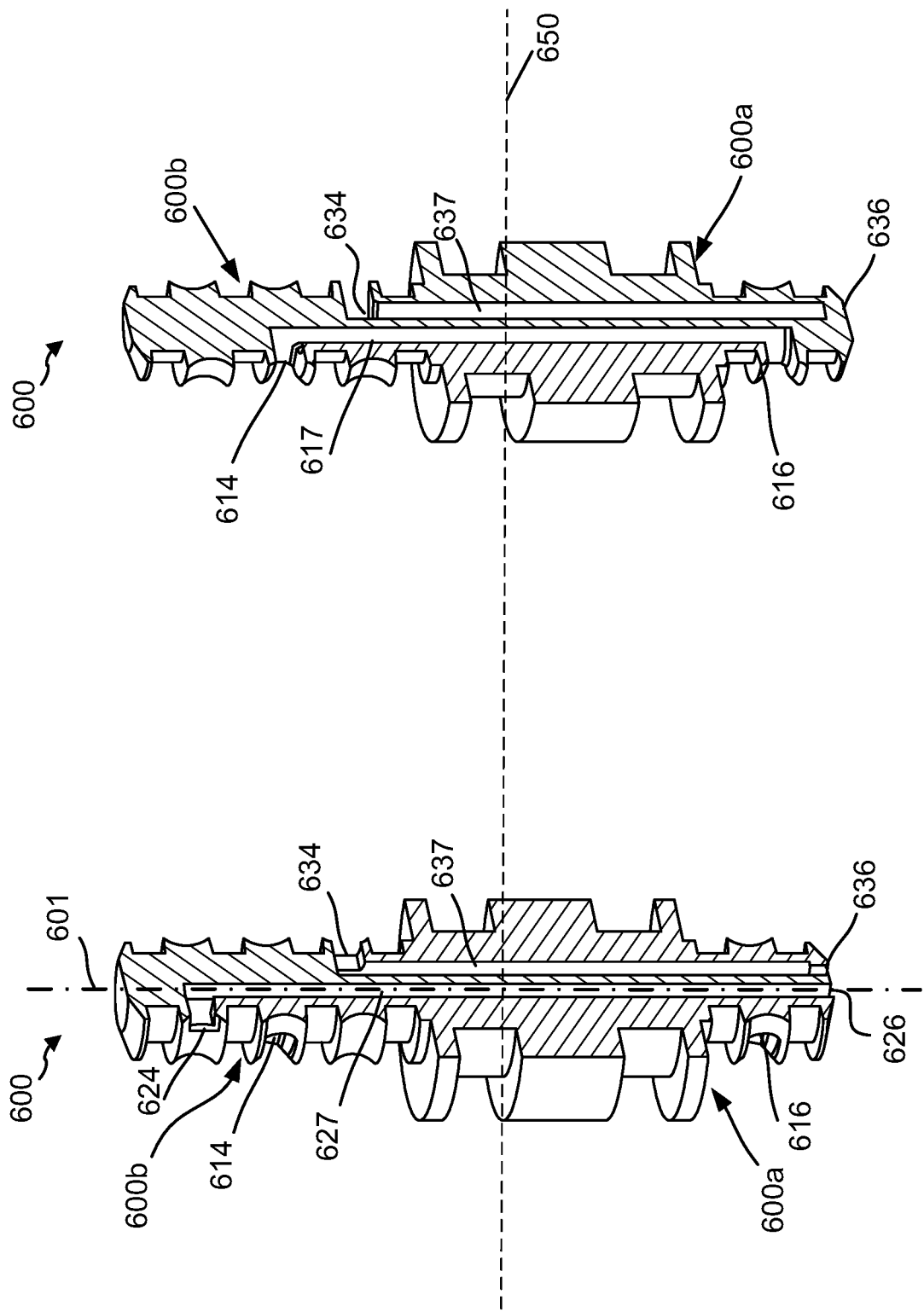

QUICK-CHANGE END EFFECTOR

INCORPORATION BY REFERENCE

All publications and patent applications mentioned in this specification are incorporated herein by reference in their entirety to the same extent as if each individual publication or patent application was specifically and individually indicated to be incorporated by reference, including: U.S. patent application Ser. No. 15/975,679, titled "MULTI-CIRCUIT SINGLE PORT DESIGN IN ADDITIVELY MANUFACTURED NODE", filed on May 9, 2018.

BACKGROUND

Field

The present disclosure generally relates to additively manufactured end effectors, and more specifically to additively manufactured end effectors for fluid interfaces in additively manufactured nodes.

Background

Nodes perform important connection functions between various components in transport structures. The nodes may be bonded to other components including tubes, extrusions, panels, and other nodes. For example, nodes can be used to perform connections for panels. A transport structure such as an automobile, truck or aircraft employs a large number of interior and exterior panels. Most panels must be coupled to, or interface with, other panels or other structures in secure, well-designed ways. These connection types may be accomplished by using nodes. The nodes, or joint members, may serve not only to attach to, interface with, and secure the panel, but they also may be used to form connections to other components of the automobile (e.g., another panel, an extrusion, tubes, other nodes, etc.).

The design and manufacture of end effectors for interfacing with nozzles of the nodes has several problems. For example, the end effectors are often specialized structures requiring intricate sub-substructures. It is often extremely difficult to manufacture these types of complex structures efficiently or cheaply using traditional manufacturing processes. For another example, in the manufacturing process, there are a large number of nodes, the conventional interfaces with the nozzles of the nodes may be too time consuming and may not be efficient for mass assembly.

There is a need to develop efficient end effectors with increased sophistication and superior capabilities for the interface nozzles, specifically, for the nozzles of the nodes of transport structures to implement potentially high-performance applications at manageable price points.

SUMMARY

End effectors for interfacing with the nozzles of the nodes, including the nodes for transport structures, and the additive manufacture thereof will be described more fully hereinafter with reference to various illustrative aspects of the present disclosure.

In one aspect of the disclosure, an end effector for interfacing with a nozzle is provided. The end effector comprises a first end, which includes a receptacle. The receptacle is configured to receive the nozzle. The nozzle includes one or more nozzle retention features and a first nozzle inlet. The end effector comprises one or more retention features positioned along a perimeter of the receptacle, where each of the one or more retention features is movable between a first position and a second position. Each of the one or more retention features is configured to lock the nozzle by securing onto a corresponding one of the one or more nozzle retention features in the first position, and to release the nozzle in the second position. The end effector may further comprise one or more actuators configured to actuate the one or more retention features between the first position and the second position. The end effector comprises a first channel, which includes a first inlet and a first outlet. The first outlet is positioned inside the receptacle and is configured to be coupled to the first nozzle inlet in the first position.

In another aspect of the disclosure, a method of using an end effector to interface with a nozzle is provided. The method comprises receiving the nozzle in a receptacle of the end effector. The method comprises actuating one or more retention features of the end effector to a first position to secure onto a corresponding one of one or more nozzle retention features to lock the nozzle. The method comprises applying vacuum to a second inlet of the end effector, where a second outlet of the end effector is coupled to a second nozzle inlet. The method comprises injecting a first fluid to a first inlet of the end effector, wherein a first outlet of the end effector is coupled to a first nozzle inlet.

It will be understood that other aspects of nodes for connecting with various components in transport structures and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of nodes in transport structures and the manufacture thereof will now be presented in the detailed description by way of example, and not by way of limitation, in the accompanying drawings, wherein:

FIG. 6A illustrates a cross-section view of a three-channel nozzle for the single port node in FIG. 4.

FIG. 6B illustrates another cross-section view of the three-channel nozzle in FIG. 6A.

DETAILED DESCRIPTION

Figure 1:
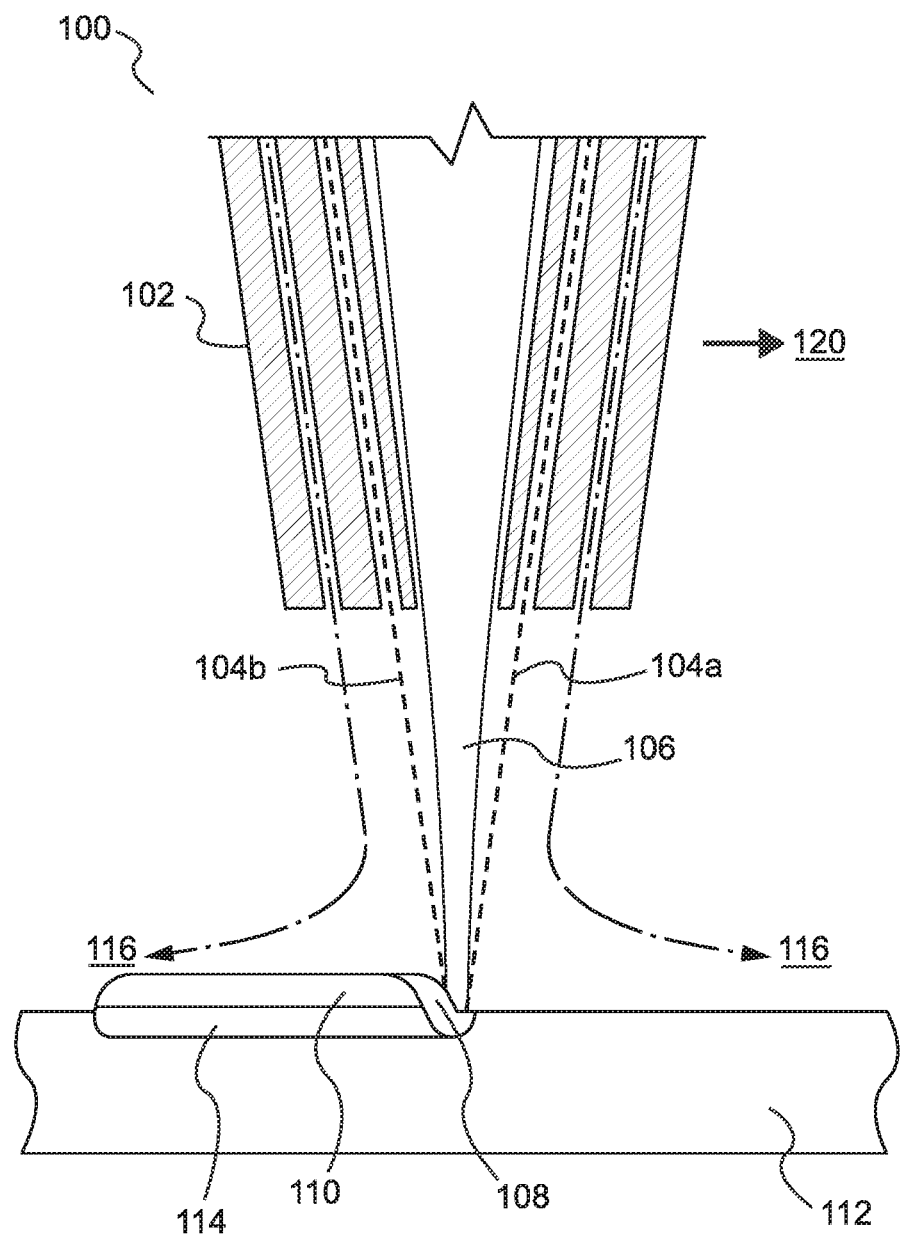
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "example" and "exemplary" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed an end effector for interfacing with a nozzle. The end effector comprises a first end, which includes a receptacle. The receptacle is configured to receive the nozzle. The nozzle includes one or more nozzle retention features and a first nozzle inlet. The end effector comprises one or more retention features positioned along a perimeter of the receptacle, where each of the one or more retention features is movable between a first position and a second position. Each of the one or more retention features is configured to lock the nozzle by securing onto a corresponding one of the one or more nozzle retention features in the first position, and to release the nozzle in the second position. The end effector may further comprise one or more actuators configured to actuate the one or more retention features between the first position and the second position. The end effector comprises a first channel, which includes a first inlet and a first outlet. The first outlet is positioned inside the receptacle and is configured to be coupled to the first nozzle inlet in the first position.

In many cases, the nodes, and other structures described in this disclosure may be formed using additive manufacturing (AM) techniques, due in part to AM's innumerable advantages as articulated below. Accordingly, certain exemplary AM techniques that may be relevant to the formation of the nodes described herein will initially be discussed. It should be understood, however, that numerous alternative manufacturing techniques, both additive and conventional, may instead be used in forming the nodes (in part or in whole) disclosed herein, and that the identified nodes need not be limited to the specific AM techniques below.

Those that stand to benefit from the structures and techniques in this disclosure include, among others, manufacturers of virtually any mechanized form of transport, which often rely heavily on complex and labor-intensive tooling, and whose products often require the development of nodes, panels, and interconnects to be integrated with intricate machinery such as combustion engines, transmissions and increasingly sophisticated electronics. Examples of such transport structures include, among others, trucks, trains, tractors, boats, aircraft, motorcycles, busses, and the like.

Additive Manufacturing (3-D Printing). Additive manufacturing (AM) is advantageously a non-design specific manufacturing technique. AM presents various opportunities to realize structural and non-structural connections between various components. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, AM provides significant flexibility in enabling the use of alternative or additional connection techniques. AM provides the platform to print components with complex internal channels and geometries, some of which are impossible to manufacture using conventional manufacturing techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
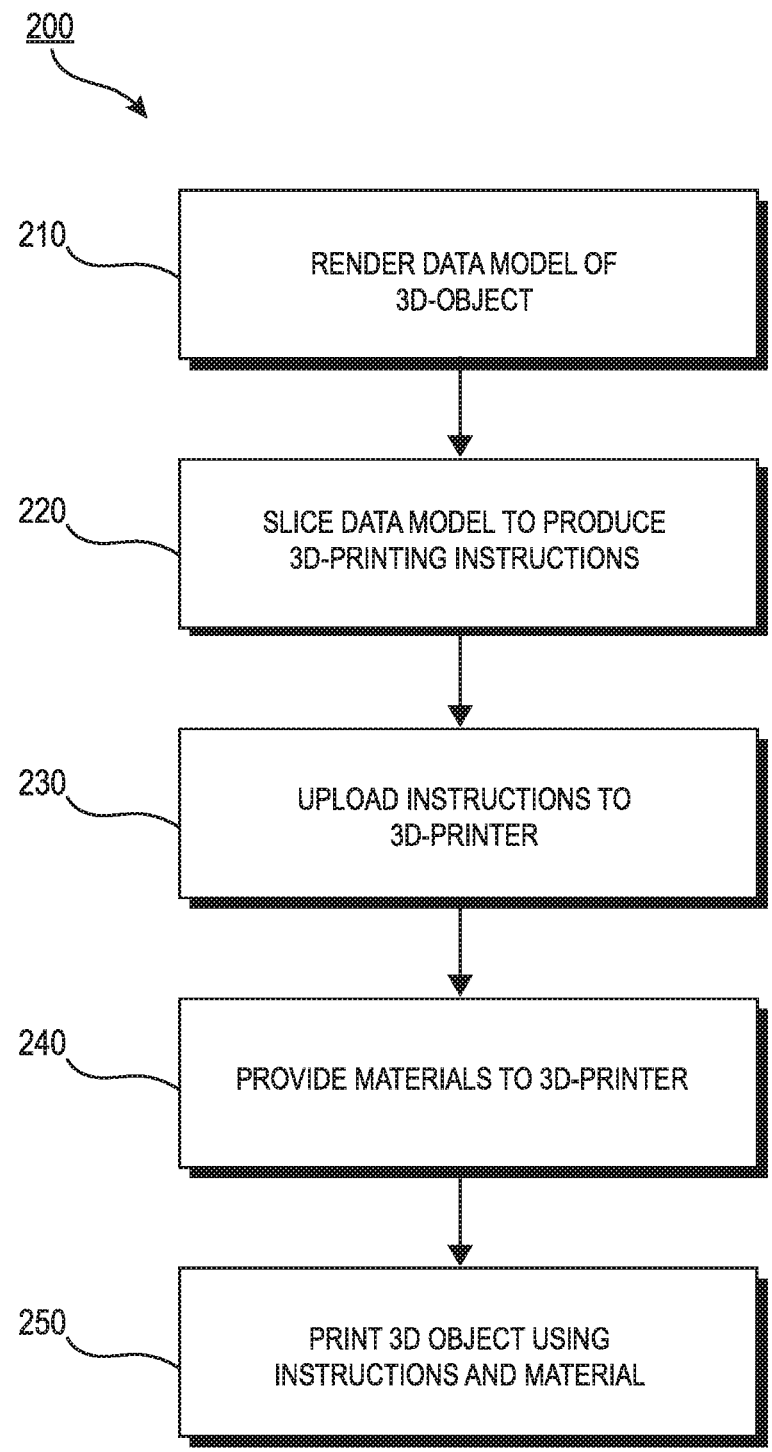
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
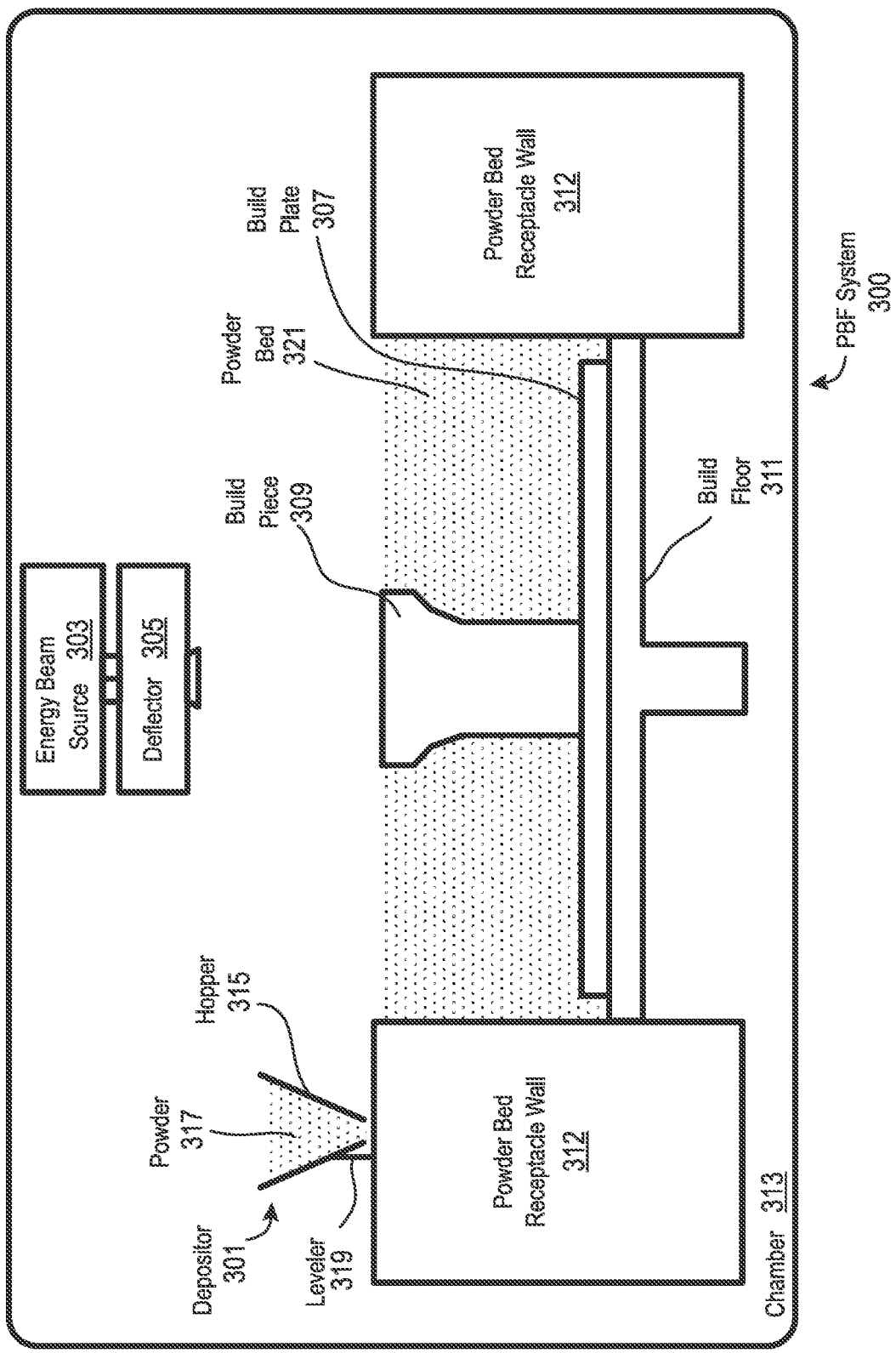
FIGS. 3A-D illustrate an exemplary powder bed fusion (PBF) system during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
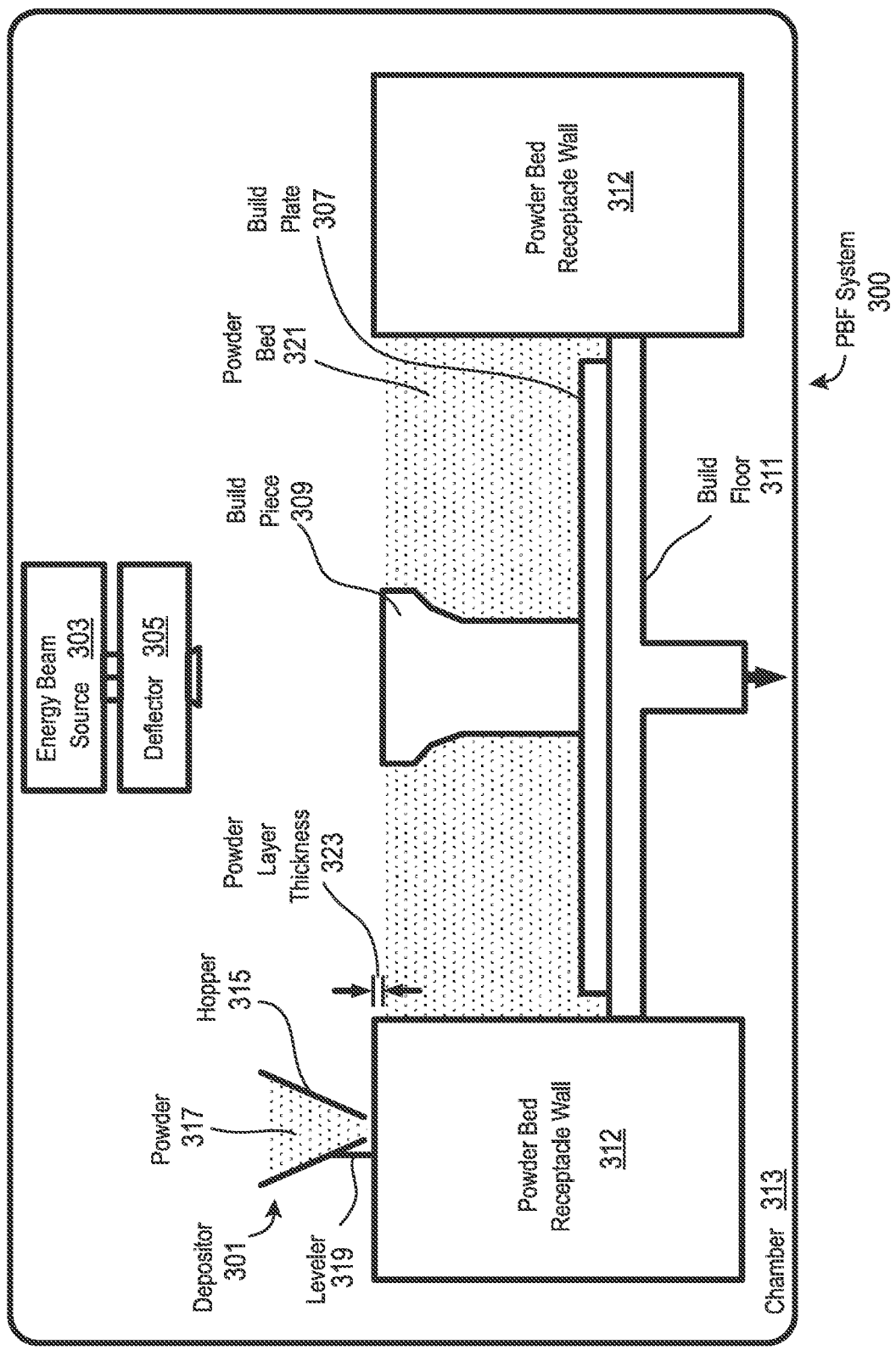

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
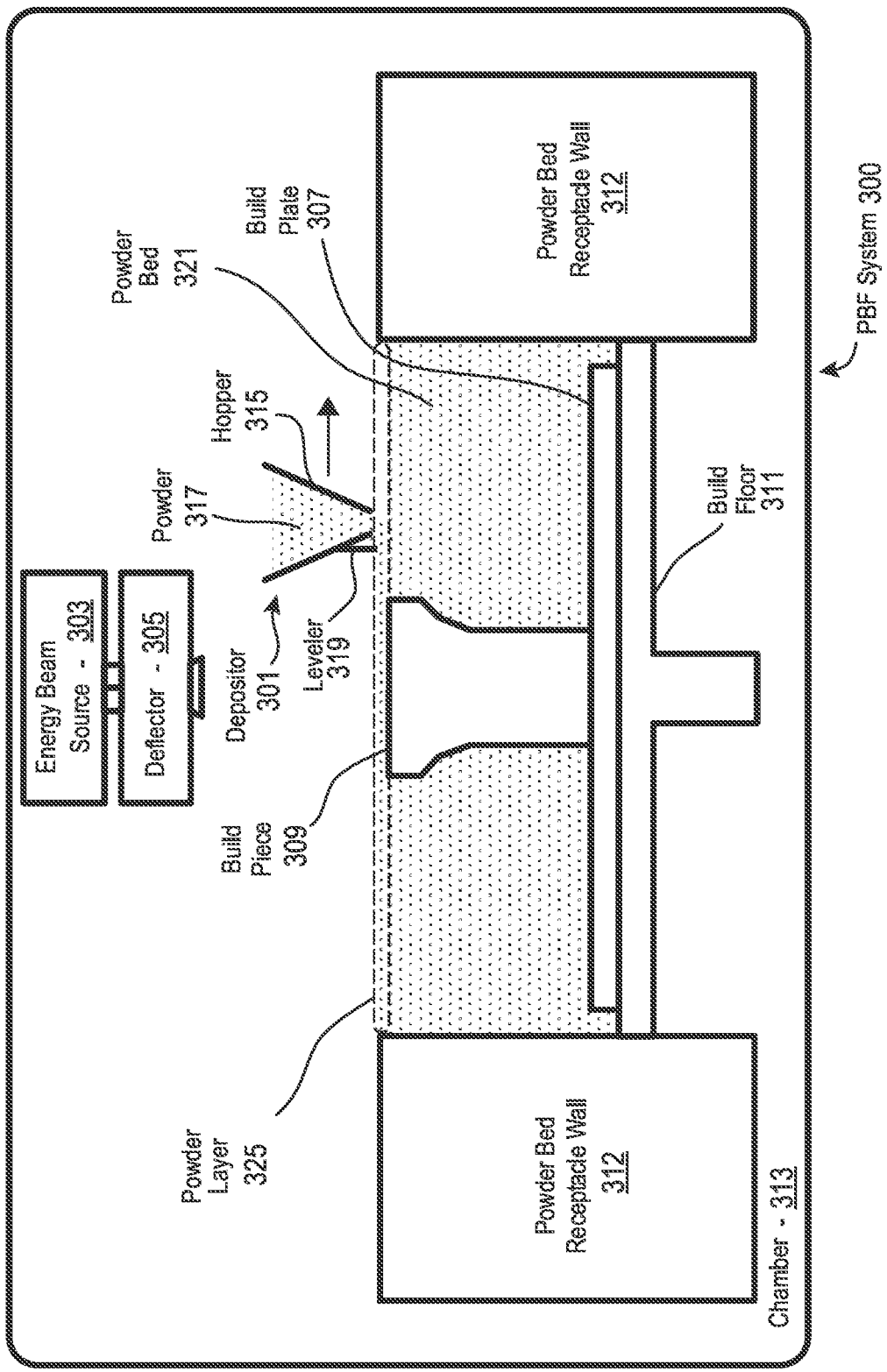

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
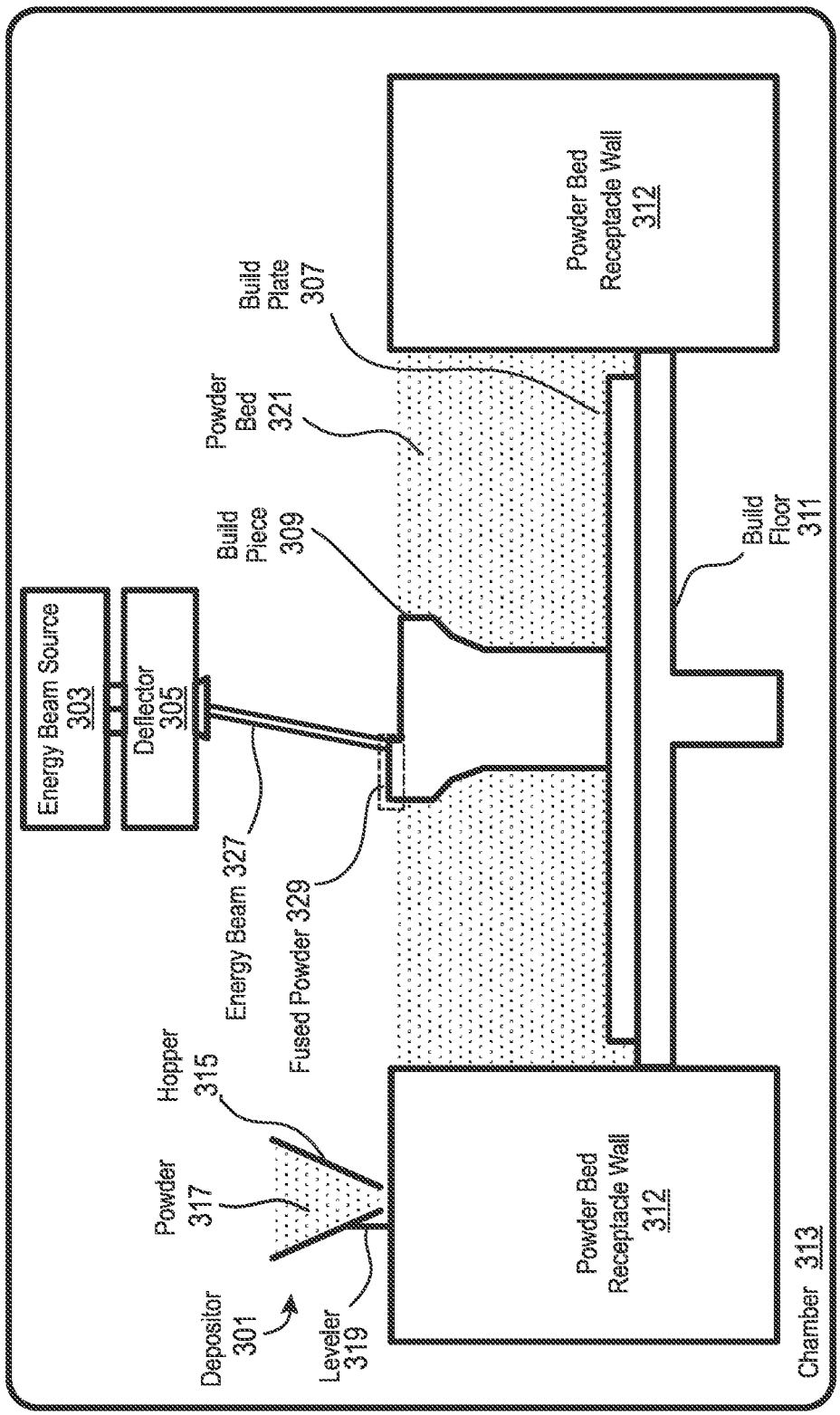

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

One aspect of this disclosure presents a node for enabling connection of various components of transport structures. The node may include a port extending inwardly from a surface to form a recess. The node may further include an inlet aperture disposed inside the port and an outlet aperture disposed inside the port. The inlet aperture is configured to receive a fluid injected into at least one region to be filled by the fluid. The outlet aperture is configured to enable the fluid to flow out of the at least one region. The port is configured to receive a nozzle to enable injection of the fluid and removal of the fluid. For example, the fluid can be an adhesive configured to bond various components together. In an embodiment, at least one connection of the node may be a part of a vehicle chassis. This type of node connection may incorporate adhesive bonding between the node and the component to realize the connection. Sealants may be used to provide adhesive regions for adhesive injection. In an exemplary embodiment, a seal may act as an isolator to inhibit potential galvanic corrosion caused, e.g., by the chronic contact between dissimilar materials.

Figure 4:
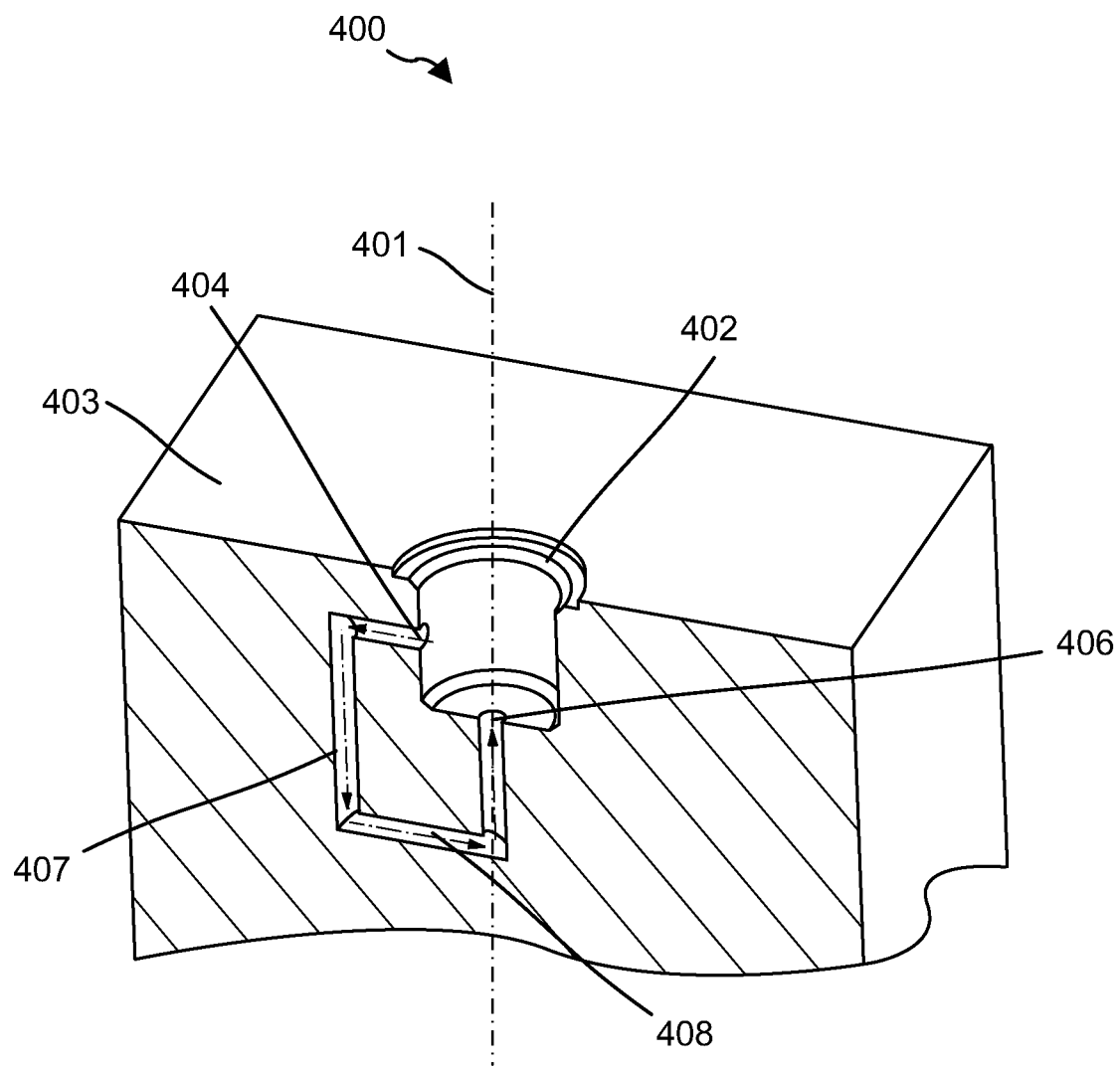
FIG. 4 illustrates a cross-section view of an example of a single port node for bonding to various components.

FIG. 4 illustrates a cross-sectional view of an example of a single port node 400 for bonding to various components according to one embodiment of this disclosure. The node 400 can include a port 402, an inlet aperture 404 and an outlet aperture 406. For example, the port 402 may extend inwardly from an external surface 403 to form a recess. The inlet aperture 404 is disposed inside the port 402 and configured to receive a fluid 408 injected into at least one region to be filled by the fluid. For example, the fluid may be an adhesive configured to bond to various components through at least one adhesive region. The outlet aperture 406 is disposed inside the port 402 and configured to enable the fluid 408 to flow out of the at least one region. The port 402 is configured to receive a nozzle to enable injection and removal of the fluid 408. Adhesive is used below as an example in this disclosure for the fluid, however, the fluid can be any other fluid as well.

The port 402 may additionally be a vacuum port for applying negative pressure to draw the adhesive towards the outlet aperture 406 to which the port is coupled. The outlet aperture 406 is configured to be coupled to a negative pressure source, and the port 402 is configured to be both an injection port and a vacuum port. While the adhesive application process in this disclosure may include a combination of vacuum and adhesive applications, the disclosure is not limited as such, and adhesive may in some exemplary embodiments be injected without use of negative pressure. In these cases, the positive pressure causing the adhesive flow may be sufficient to fill the adhesive regions.

As shown in FIG. 4, the single port 402 may be utilized for both the adhesive inlet and outlet operations. The port 402 may be in a cylindrical shape and extend in an axial direction in some embodiments. In some other embodiments, the port can be in a conical shape, a cubic shape, or any other shape. In some alternative embodiments, the port may be a protrusion extending upwardly from the external surface 403 with a recess in a central portion of the protrusion that includes the apertures or other structures. The ports may also include protrusions built in surrounding holes, such that the tips of the protrusions may be flush with or proximate in height to the external surface of the node. In embodiments utilizing protruding ports, the ports may optionally be fabricated with the intent of being broken off upon completion of the bonding process, which may also reduce mass and volume of the corresponding node or other structure that includes the ports. For example, the port may have other configurations as well. For purposes of this disclosure, "port" may be broadly construed to include either a recess or protrusion in a structure, along with their constituent aperture(s), that receives or provides a substance (including, e.g., fluids, gasses, powders, etc.), and therefore "port" would encompass any of the embodiments discussed above.

As shown in FIG. 4, two apertures 404 and 406 are disposed inside the port 402. The adhesive inlet aperture 404 is configured for receiving adhesive 408 injected into the channel 407 and toward the adhesive regions. The adhesive outlet aperture 406 is configured for removing the adhesive 408 from the channel 407 and/or for determining whether and when the adhesive 408 has substantially filled the necessary regions of the node or structure. For example, the inlet aperture 404 is disposed on a side wall of the port 402. Thus, the adhesive 408 is injected into the channel 407 by a positive pressure perpendicular to an axial direction 401 of the port 402. This would advantageously prevent the displacement of the nozzle during the adhesive injection process. If the adhesive is injected along the axial direction 401 of the port 402, the injection pressure may push the effector or applicator for injecting the adhesive out of the port. Thus in this embodiment, the adhesive injection is perpendicular to the axial direction 401.

The outlet aperture 406 may disposed on a bottom of the port 402. In some embodiments, the node 400 may further include a second inlet aperture disposed inside the port 402, for example, on the side wall of the port 402. In some embodiments, the node 400 may further include a plurality of inlet apertures disposed inside the port 402. For example, the plurality of inlet apertures may be disposed circumferentially around the port 402. Similarly, in some embodiments, the node 400 may further include a second outlet aperture disposed inside the port 402, for example, on the bottom of the port 402. In some embodiments, the node 400 may further include a plurality of outlet apertures disposed inside the port 402. For example, the plurality of outlet apertures may be disposed in the bottom of the port 402. It will also be noted in this simplified embodiment that, while the adhesive 408 is shown as flowing from input aperture 404 through a short channel 407 to outlet aperture 406, in practice, the adhesive 408 may be designed to flow through a desired region of the node 400 where the adhesive 408 is needed. Thus, the short channel 407 may instead be a long channel or series of channels coupled intermediately to one or more adhesive bond regions, which are spaces or regions of the node 400 desired for adhesive deposit. These details are omitted from the view of FIG. 4 for simplicity and clarity.

There are many possible variations and configurations of the location and arrangement of the inlet aperture 404 and the outlet aperture 406. The above example is for illustration purposes only and is not intended to limit the scope of the disclosure. In some embodiments, the inlet and outlet apertures 404 and 406 may have a diameter of 1 mm or greater, although smaller values are possible and may be equally suitable in some embodiments. For example, the inlet and outlet apertures 404 and 406 may have a diameter between 1 mm and 30 mm in an embodiment. The inlet and outlet apertures may have the same or different diameters. The inlet and outlet apertures 404 and 406 need not have the same shape, and may be shaped in geometries other than elliptical geometries. For example, the apertures 404 and 406 may be rectangular or otherwise arbitrarily shaped. In some cases, the shape of the apertures 404 and 406 coincides with the shape of one or more portions of the channels that join them. The port 402 may have a cylindrical shape or any other shape. The inlet aperture and the outlet aperture may have any suitable shape as noted. The port may also include any other shape, such as a cubic shape, a conical shape, or any arbitrary shape.

The node 400 may further include at least one channel 407 extending from the adhesive inlet aperture 404 to the at least one adhesive bond region (not shown) and further to the adhesive outlet aperture 406. The port 402 is coupled to the channel 407 through both the adhesive inlet aperture 404 and the adhesive outlet aperture 406 disposed inside the port 402. Instead of having two separate ports for injection and removal of the adhesive as is the conventional practice, the adhesive inlet aperture 404 inside the port 402 receives injection of the adhesive, and the adhesive outlet aperture 406 inside the same port 402 performs removal of the adhesive (or, in other embodiments, a visual, tactile or other indication that the adhesive is full so that the injection operation can be ended e.g., when the adhesive begins to exit aperture 406). In this way, the single port 402 performs the functions of both injection and removal of the adhesive. The channel(s) 407 may extend from the adhesive inlet aperture 404, may travel through the node 400 to apply adhesive to the bond region(s), and may be coupled to the adhesive outlet aperture 406. For example, the channel may be an elliptical channel that traverses the node in a desired location and may connect to a wider or bigger bond region, and then may be routed from the bond region as a similarly-shaped elliptical channel to the adhesive outlet aperture 406. In some embodiments, multiple parallel channels may be employed as an alternative to a single, segmented channel. Moreover, the diameter of the channels can be varied along their lengths. These structures can advantageously be manufactured using AM techniques without requiring any significant post-processing operations.

In other embodiments, adhesive inlet aperture 404 may comprise more than one aperture and may receive injected adhesive 408 in parallel. With reference to the single-port embodiment of FIG. 4, for example, the inlet aperture 404 may in these embodiments comprise a plurality of inlet apertures disposed along a designated circumference of the cylindrical region of the port. In addition, in these or other embodiments, more than one adhesive outlet aperture may be arranged on a bottom portion of the cylindrical region. These one or more apertures 404 and/or 406 may correspond to one or more channels 407 for delivering adhesive to and from the adhesive bond region(s). In still other embodiments, as noted above, each of the one or more apertures and/or channels may include a variety of geometries, as suitable for the application.

The channel 407 may be a part of the node 400 and may be additively manufactured using any suitable AM technique. The channel 407 may comprise multiple channel portions after it enters and then exits an adhesive region. Depending on the embodiment and whether adhesive is injected serially or in parallel, the node may be considered to have one or more channels as described above. In general, the design of the channels may enable sequential flow of the adhesive into specific adhesive bond regions between an inner surface of the node and an outer surface of a component intended to be connected to the node.

The node may also be extended, elongated, or shaped in any way to enable multiple sets of interface regions (i.e., sets of one or more adhesive bond regions with sealants and channels as described above to realize a connection) to exist on a single node. For example, in one embodiment, the node is rectangular, with separate interfaces on two or more sides of the rectangular node connecting to different panels via the adhesive process and techniques described above. In other embodiments, nodes may be constructed to have interface regions in close proximity so that two respective panels may be spaced very closely, or so that the panels may make contact. Numerous embodiments and geometries of the node may be contemplated.

To better facilitate assembly, the node may be printed in two or more parts, with the two or more parts being connected together prior to adhesive injection. The node may constitute additional features, such as connection features to other structures or other structural or functional features that are not explicitly shown in the illustrations herein to avoid unduly obscuring the concepts of the disclosure. These additional features of the node may cause portions of the node to take a different shape or may add structures and geometrical features that are not present in the illustrations herein. These additional features and structures may be additively manufactured along with the remainder of the node, although this may not necessarily be the case, as in some applications, traditional manufacturing techniques such as casting or machining may be used.

Advantageously, the single port design of the node 400 is efficient, as the port 402 is configured to perform multiple functions, such as an adhesive inlet port and an adhesive outlet port. The port 402 of the node 400 enables the adhesive injection process and removal process through a single port. The port 402 is both an entry point and an exit point for the adhesive 408 or other fluids. In some embodiments, the port 402 is further a vacuum port where the adhesive outlet port is connected to a negative pressure source. In other embodiments, the port 402 need not be a vacuum port but may, for example, be an exit point for excess adhesive.

The single port node 400 is further advantageous to reduce the complexity of the adhesive applicator system, which may in some embodiments include a nozzle for performing the adhesive injection/vacuum procedure. Only one nozzle is required to draw a vacuum (where desired), inject the adhesive and remove the excessive adhesive. This procedure is in contrast to conventional multi-port designs. The nozzle can further have the ability to allow for the transfer of two or more fluids through the port 402. This would make the single port design conducive to embodiments wherein other fluids, for example, sealants, may be used to cap off the port after adhesive injection.

The single port node 400 is further advantageous in that it reduces the complexity of designing an automated system for applying adhesives. As an example, the nozzle for applying adhesive may be carried or used by a robot. Since the robots would have to interface with just one port, the robots can be leaner and more compact than may otherwise be required in a conventional assembly system requiring multiple ports. Furthermore, because assembly systems often involve a large number of nodes, the single port node can greatly increase the efficiency of the assembly process.

A plurality of nozzles, or interface nozzles, may be utilized with the nodes having a single port for adhesive as described above. The terms "nozzle" and "interface nozzle" are used interchangeably in this disclosure. The nozzles may include a plurality of channels, depending on the number of materials used in the adhesive injection process or other factors. O-Rings or other seals may be utilized to obtain a sealed interface between the surface of the port on the node, and the nozzle. This sealed interface would ensure that the adhesive injection process occurs in a sealed manner. This sealed interface is particularly advantageous in embodiments utilizing a vacuum connection during the adhesive injection process. The nozzles may be additively manufactured.

Figure 5A:
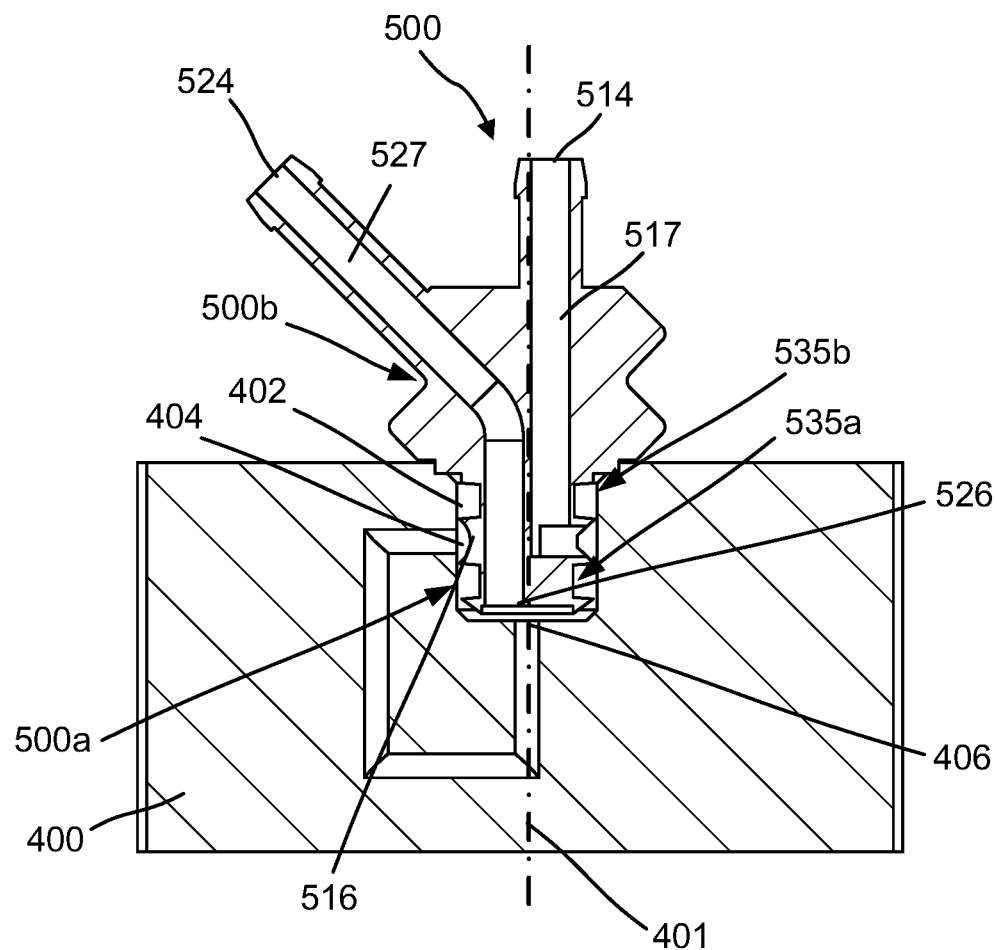
FIG. 5A illustrates a cross-section view of a two-channel nozzle for the single port node in FIG. 4.
Figure 5B:
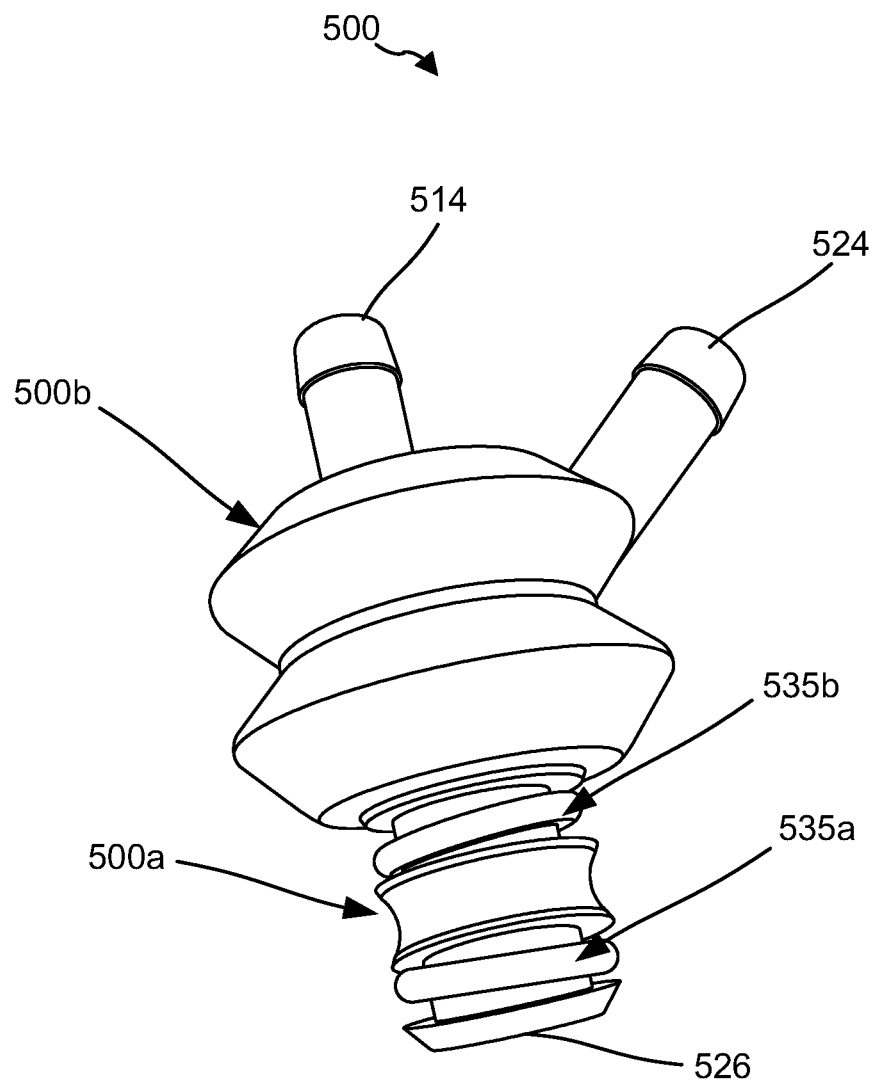
FIG. 5B illustrates a perspective view of the two-channel nozzle in FIG. 5A.

FIG. 5A illustrates a cross-section view of a two-channel nozzle 500 for the single port node 400, where the nozzle 500 is connected to the node 400. FIG. 5B illustrates a perspective view of the two-channel nozzle 500. Referring to FIG. 5A and FIG. 5B, the nozzle 500 includes a first channel 517 and a second channel 527. The first channel 517 includes a first inlet 514 of nozzle and a first outlet 516 of nozzle. The first outlet 516 of nozzle is coupled to the inlet aperture 404 disposed inside the port 402 of the node 400. The second channel 527 includes a second inlet 524 of nozzle and a second outlet 526 of nozzle. The second outlet 526 of nozzle is coupled to the outlet aperture 406 disposed inside the port 402. The first channel 517 and the second channel 527 are isolated from one another. The first channel 517 is configured to inject an adhesive through the first outlet 516 of nozzle into the inlet aperture 404. The second channel 527 is configured to receive the adhesive from the outlet aperture 406. In some embodiments, the second inlet 524 of nozzle is configured to be coupled to a negative pressure source to apply vacuum to the outlet aperture 406. The nozzle 500 may be additively manufactured as well.

The nozzle 500 includes a first end 500$a$ and a second end 500$b$. The first end 500$a$ is also referred to as a port end, which is configured to be inserted into the port 402. The port end 500$a$ of the nozzle may have a size compatible with a diameter of the port 402. The second end 500$b$ is also referred to as an effector end, which is configured to be coupled to an effector.

The nozzle 500 may work with one fluid, which is referenced herein as a single circuit embodiment. The nozzle 500 may be used to inject the adhesive and remove the adhesive without applying vacuum. The single circuit embodiment may be utilized to simplify the number of variants in a manufacturing system. For example, the first outlet of nozzle 516 is disposed on a side wall of the port end 500$a$, in order to enable the adhesive to be injected into the inlet aperture 404 with a positive pressure perpendicular to an axial direction 401 of the port 402. The second outlet of nozzle 526 may be disposed on a bottom of the port end of 500$a$. The single circuit embodiment can have a great flow capability, but the single circuit embodiment only works with a single fluid, such as an adhesive, or a sealant, that would not be vacuumed and would be injected with positive pressure only.

The nozzle 500 may further work with two fluids, which is referenced herein as a two circuit embodiment. The nozzle 500 may be used to apply vacuum to the adhesive outlet aperture 406 of the node 400 through the second channel 527, and inject the adhesive into the adhesive inlet aperture 404 of the node 400 through the first channel 517.

The port end 500$a$ of the nozzle 500 may be inserted into the port 402 of the node 400. The vacuum may be applied to the port 402. The negative pressure from the vacuum may cause the nozzle 500 to be pulled more tightly into the port 402, which is an interface receptacle port. This tight connection helps ensure that the correct inlets and outlets of the nozzle meet snugly with the respective apertures of the node 400 and that the adhesive application procedure flows smoothly and efficiently. The adhesive can be applied to the inlet aperture 404 of the port 402. Here again, while the channel between inlet aperture 404 and outlet aperture 406 is shown for simplicity as a simple loop, the channel in practice may extend to one or more adhesive bond regions of the node 400 as described above with reference to FIG. 4.

In an exemplary embodiment, the adhesive is injected into the inlet aperture 404 with a positive pressure perpendicular to the axial direction 401 of the port 402. For example, the first outlet of nozzle 516 is disposed on a side wall of the port end 500a. The pressure from the injection of the adhesive acts radially in the nozzle 500 and port 402. That is, the injection of the adhesive causes a force applied on the nozzle along a radial direction. The force from the injection is perpendicular to the axial direction 401 of the port 402. Thus, the force neither pulls nor pushes the nozzle 500 in or out of the receptacle port 402 during the adhesive injection process. This configuration is advantageous to form a stable connection between the nozzle 500 and the node 400. The stability may be further increased in embodiments using a vacuum. As indicated above, the negative pressure from the vacuum together with the orientation of the outlet aperture 406 at the bottom of the port 402 ensures an even tighter fit of the nozzle 500 into the port 402 as the vacuum is drawn.

The first channel 517 and the second channel 527 of the nozzle 500 may have various relative orientations and configurations. For example, the first channel 517 and the second channel 527 may extend away from each other at the second end 500b (referred to herein also as the effector end 500b) as shown in FIG. 5A. The first channel 517 and the second channel 527 may alternatively be parallel to each other at the second end 500b. In some embodiments, the first channel 517 and the second channel 527 substantially extend along the axial direction 401 at the port end 500a, such that the two channels 517 and 527 can be effectively inserted into the port 402.

The nozzle 500 may further include one or more O-Rings, or sealants. O-Rings or sealants may be used at the nozzle-port interface as well as the nozzle-effector interface. A sealant region may include features such as a groove, dovetail groove, inset or other feature built into a surface of the nozzle. The sealant region may accept a sealant such as an O-Ring.

Referring to FIG. 5A, the nozzle 500 may include a first O-ring 535a disposed between the first outlet of nozzle 516 and the second outlet of nozzle 526. The second outlet of nozzle 526 is coupled to the outlet aperture 406 of the node 400 to apply the negative pressure. The first O-ring 535a is used to provide a seal to the vacuum, to prevent unwanted flow of the adhesive, and to isolate the first outlet of nozzle 516 from the second outlet of nozzle 526. The nozzle 500 may further include a second O-ring 535b disposed above the first outlet of nozzle 516 at the port end 500a. The second O-ring 535b is used to provide an additional seal to the port 402 and further prevent unwanted flow of the adhesive. It will be appreciated that the first and second O-rings 535a and 535b in FIG. 5A are partially obscured from view in this drawing since they extend out of and into a plane of the drawing, and laterally behind other structures (e.g. first and second channels 517 and 527). FIG. 5B shows an alternative perspective view of the structure including an illustration of the external contour of the structure according to an embodiment. O-rings 535a and 535b are shown encircling portions of the port end 500b. An external view of nozzle 500 is also shown in FIG. 5B, and includes a view of the first and second inlets 514 and 524. In an embodiment, effector end 500b is designed to easily and efficiently fit into a corresponding portion of a robot or other structure for supplying fluids and negative pressure to the appropriate channels and for moving the effector as required from one port to another.

In addition to the nozzle with two circuits described above, a third circuit can be added in another embodiment to introduce another fluid, for example, a sealant which can be used to encapsulate the injected adhesive. The sealant can be dispensed after the adhesive at the time of removal of the interface nozzle from the interface port. The sealant may be configured to cure or solidify well in advance of the adhesive curing. The nozzle with three circuits may include three channels, one channel for each respective fluid.

FIG. 6A illustrates a cross-section view of a three-channel nozzle 600 for the single port node 400. FIG. 6B illustrates another cross-section view of the three-channel nozzle 600 from another plane. More specifically, as described further below, FIG. 6A is offset relative to FIG. 6B about a longitudinal axis 601 such that cross-sections of the nozzle 600 are viewable at two different section planes. Referring to FIG. 6A and FIG. 6B, the nozzle 600 includes a first channel 617, a second channel 627 and a third channel 637. The first channel 617 includes a first inlet of nozzle 614 and a first outlet of nozzle 616. The first outlet of nozzle 616 is configured to be coupled to the inlet aperture 404 of the node 400 (FIG. 4). The second channel 627 includes a second inlet of nozzle 624 and a second outlet of nozzle 626. The second outlet of nozzle 626 is configured to be coupled to the outlet aperture 406. The first channel 617 and the second channel 627 are isolated from one another. The first channel 617 is configured to inject an adhesive through the first outlet of nozzle 616 into the inlet aperture 404. The second channel 627 is configured to remove the adhesive from the outlet aperture 406 (FIG. 4). In some embodiments, the second inlet of nozzle 624 is configured to be coupled to a negative pressure source to apply vacuum to the outlet aperture 406. The first inlet of the nozzle 614 can be connected to the first outlet of nozzle 616 through the first channel 617. The adhesive can be injected from the robot into the first inlet of nozzle 614 and can travel to first outlet of nozzle 616 and then injected into the port. The second inlet of the nozzle 624 can be connected to the second outlet of nozzle 626 through the second channel 627. The excess adhesive from the port can travel from the second outlet of nozzle 626 to the second inlet of nozzle 624, and to the robot or other controlling device.

In addition to the first channel 617 and the second channel 627, a third channel 637 can be added to introduce a third fluid, for example, which can be a sealant to encapsulate the injected adhesive. The third channel 637 includes a third inlet of nozzle 634 and a third outlet of nozzle 636. For example, the third channel 637 is configured to dispense a sealant through the third outlet of nozzle 636. The third inlet of nozzle 634 can be connected to the third outlet of nozzle 636 through the third channel 637. The sealant can travel from the third inlet of nozzle 634 to the third outlet of nozzle 636, and can be injected into an appropriate inlet aperture in the port. The third channel 637 is isolated from the first channel 617 and the second channel 627. In an embodiment, the third fluid can be dispensed after the adhesive immediately before removal of the interface nozzle from the interface port. The nozzle 600 may be additively manufactured as well.

As is evident from the above description, FIG. 6A and FIG. 6B illustrate two cross-sections of the same nozzle 600 in order to show the positions of the various features relative to each other. FIG. 6A illustrates a cross-section including the first channel 617 and the third channel 637. FIG. 6A illustrates another cross-section including the second channel 627 and the third channel 637. As shown in FIG. 6A and FIG. 6B, the three channels 617, 627, and 637 may be disposed in different cross-sections and offset from each other. For example, the first channel 617 and the second channel 627 may be disposed on a first plane, and the third channel 637 may be disposed offset from the first plane.

Referring to FIG. 6A and FIG. 6B, the nozzle 600 includes a first end 600a and a second end 600b. As shown in FIG. 6A and FIG. 6B, the first end 600a includes the portion of the nozzle 600 below the dotted line 650 and the second end 600b includes the portion of the nozzle 600 above the dotted line 650. The first end 600a is also referred to as a port end, which is configured to be inserted into a port of a node. The second end 600b is also referred to as an effector end. The effector end 600b may be connected to an effector, which would be connected to the sealant, adhesive and vacuum apparatuses.

Since the port end 600a is configured to be inserted into the port of the node, the port end 600a may have a size compatible to a size of the port. In some embodiments, the first channel 617, the second channel 627 and the third channel 637 are extending along an axial direction 601 at the port end 600a. For example, at the port end 600a, the first channel 617, the second channel 627 and the third channel 637 may be parallel to each other along the axial direction 601. However, at the effector end 600b, the first channel 617, the second channel 627 and the third channel 637 may have different orientations. For example, the first channel 617, the second channel 627 and the third channel 637 may extend away from each other.

Figure 7A:
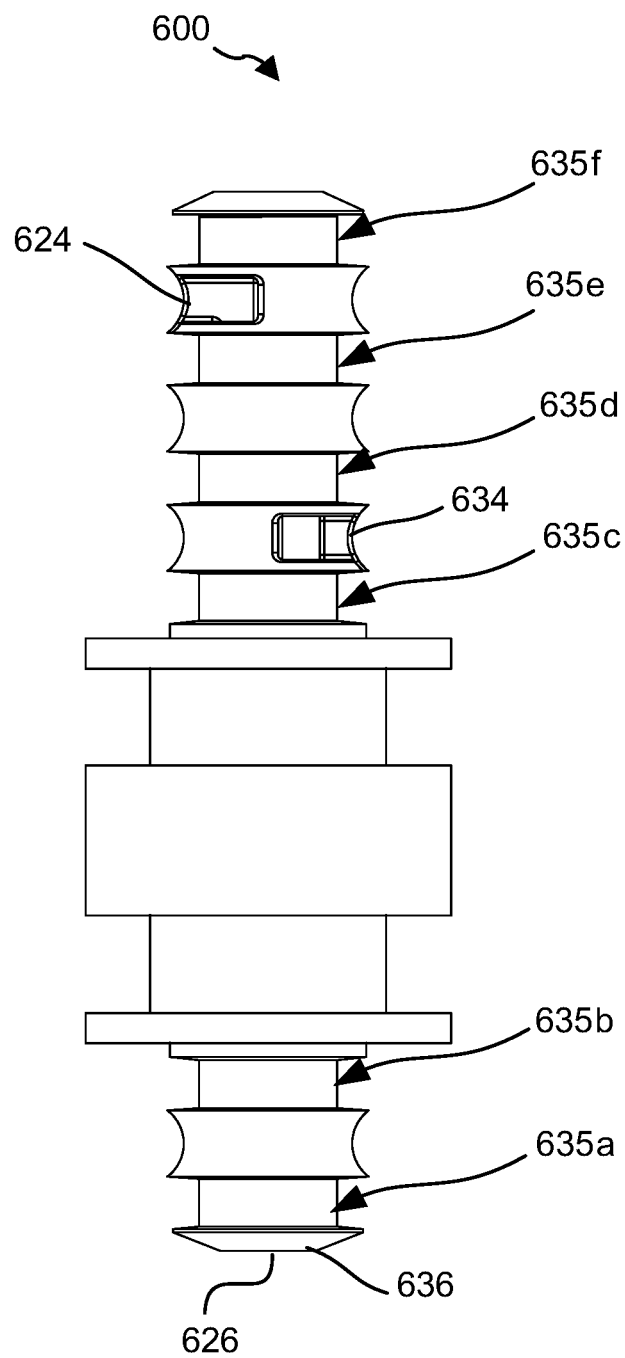
FIG. 7A illustrates a nozzle including a plurality of regions for receiving O-Rings/sealants.

FIG. 7A illustrates the nozzle 600 including a plurality of regions 635a-f for receiving O-rings/sealants. As shown in FIG. 7A, O-Rings or sealants can be used at both the nozzle-port interface and the nozzle-robot interface. A sealant region 635a-f may include features such as a groove, dovetail groove, inset or other feature built into a surface of the nozzle 600. The sealant regions 635a-f may accept a sealant such as an O-ring. The sealant regions may be used to separate different circuits, or different channels. The sealant regions may also be used to prevent unwanted flow between different channels. For example, an O-ring in region 635a may be disposed between the first outlet of nozzle 616 (obscured from view) and the second outlet of nozzle 626. As another example, the O-rings in regions 635d and 635e may be disposed between the first inlet of nozzle 614, the second inlet of nozzle 624 and the third inlet of nozzle 634, respectively.

Referring to FIGS. 6A-B and 7A, the nozzle 600 may include a first O-ring disposed in region 635a between the first outlet of nozzle 616 and the second outlet of nozzle 626, as noted above. The second outlet of nozzle 626 is coupled to the outlet aperture 406 of the node to apply the negative pressure. The first O-ring in region 635a may be used to provide a seal to the vacuum and prevent unwanted flow of the adhesive. The nozzle 600 may further include a second O-ring disposed in region 635b above the first outlet of nozzle 616 at the port end. In an embodiment, the second O-ring 635b is used to provide additional seal to the port and to further prevent unwanted flow of the adhesive. The nozzle 600 may be additively manufactured. The nozzle 600 may be disposable. This can be advantageous as nozzles can be discarded after the channels in them have been clogged due to extended use. O-rings in remaining regions 635c-f may be similarly discarded for providing isolation and sealing, and preventing contamination, etc.

Figure 7C:
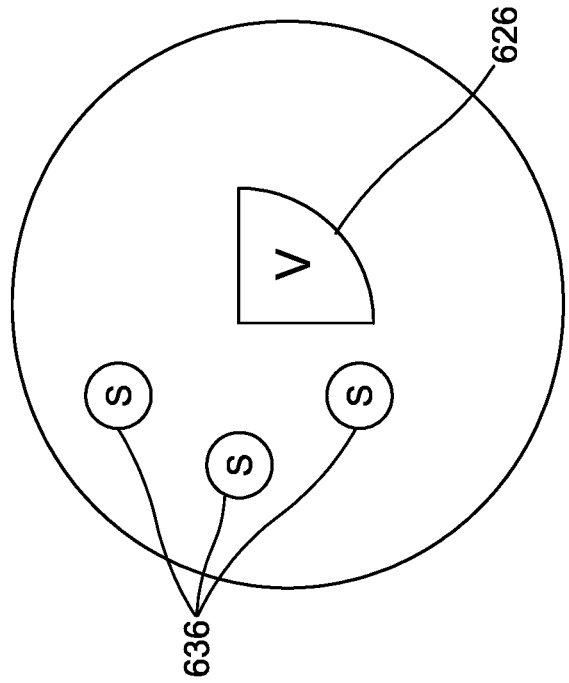
FIG. 7C illustrates a bottom view of a nozzle with a plurality of third outlets.
Figure 7B:
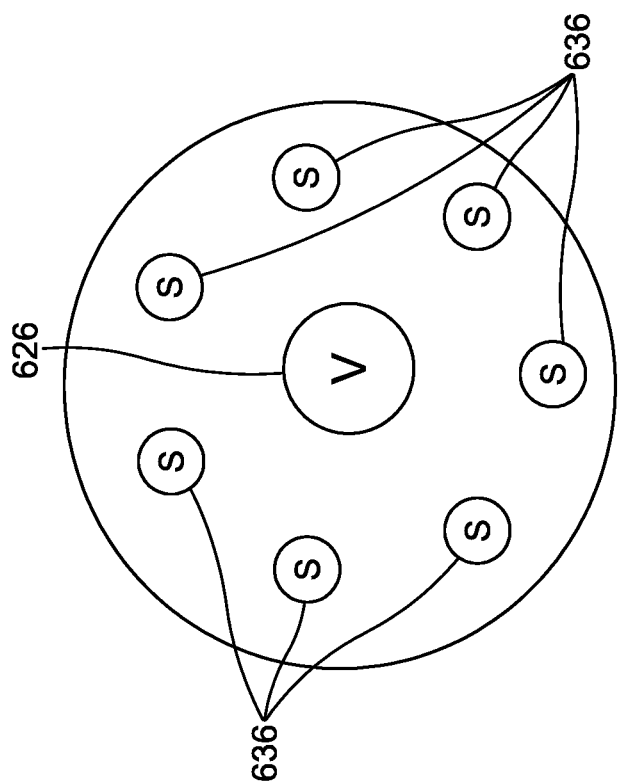
FIG. 7B illustrates a bottom view of a nozzle with a plurality of third outlets.

FIG. 7B illustrates a bottom view of a nozzle with a plurality of sealant outlets, according to one embodiment of this disclosure. Referring to FIG. 7A and FIG. 7B, a third channel can be added in the nozzle 600 to dispense a sealant through the third outlet of nozzle 636. In an exemplary embodiment, the sealant or sealer can be dispensed after the adhesive is injected and at the time before removal of the interface nozzle from the port and the cure of the adhesive. The sealant or sealer may form a cap for the port. The sealant or sealer may alternatively or additionally be used as an isolator to seal the port and prevent direct contact between the node and the component to and from the connection. Where, for example, the component and node are composed of dissimilar metals, this isolation may be crucial to preventing galvanic corrosion and therefore to enable reliable, long-lasting node-component connections.

FIG. 7B further illustrates a bottom view of a nozzle with a plurality of sealant outlets in one embodiment. Instead of having one third outlet of nozzle, the nozzle 600 can include a plurality (e.g. six (6)) of third outlets of nozzle 636. For example, the plurality of third outlets of nozzle 636 may be evenly distributed around the second outlet of the nozzle 626, which may be a vacuum port. The sealant or sealer may flow out from the plurality of third outlets of nozzle 636, instead of a single hole. The sealant may be deposited from the plurality of third outlets of nozzle 636 to form a sealant layer. The plurality of third outlets of nozzle 636 may be advantageous to evenly distribute the sealant and form a layer of sealant with a more uniform thickness, in comparison to the single third outlet of nozzle configuration. In general, one or more outlets of nozzles 636 may be suitable depending on the implementation. In still other embodiments (not explicitly shown), the first and second channels may include multiple outlets as well, e.g., to spread adhesive evenly and/or to correspond to multiple inlet and/or outlet apertures in the associated ports, as discussed with reference to an earlier embodiment of the port 400.

FIG. 7C illustrates a bottom view of a nozzle with a plurality of sealant outlets in another embodiment. The second outlet of nozzle 626 is disposed at a side at the bottom of the nozzle 600, and the plurality of third outlets of nozzle 636 are disposed at another side. This configuration may be used in a nozzle with a small cross-sectional bottom area.

Figure 8:
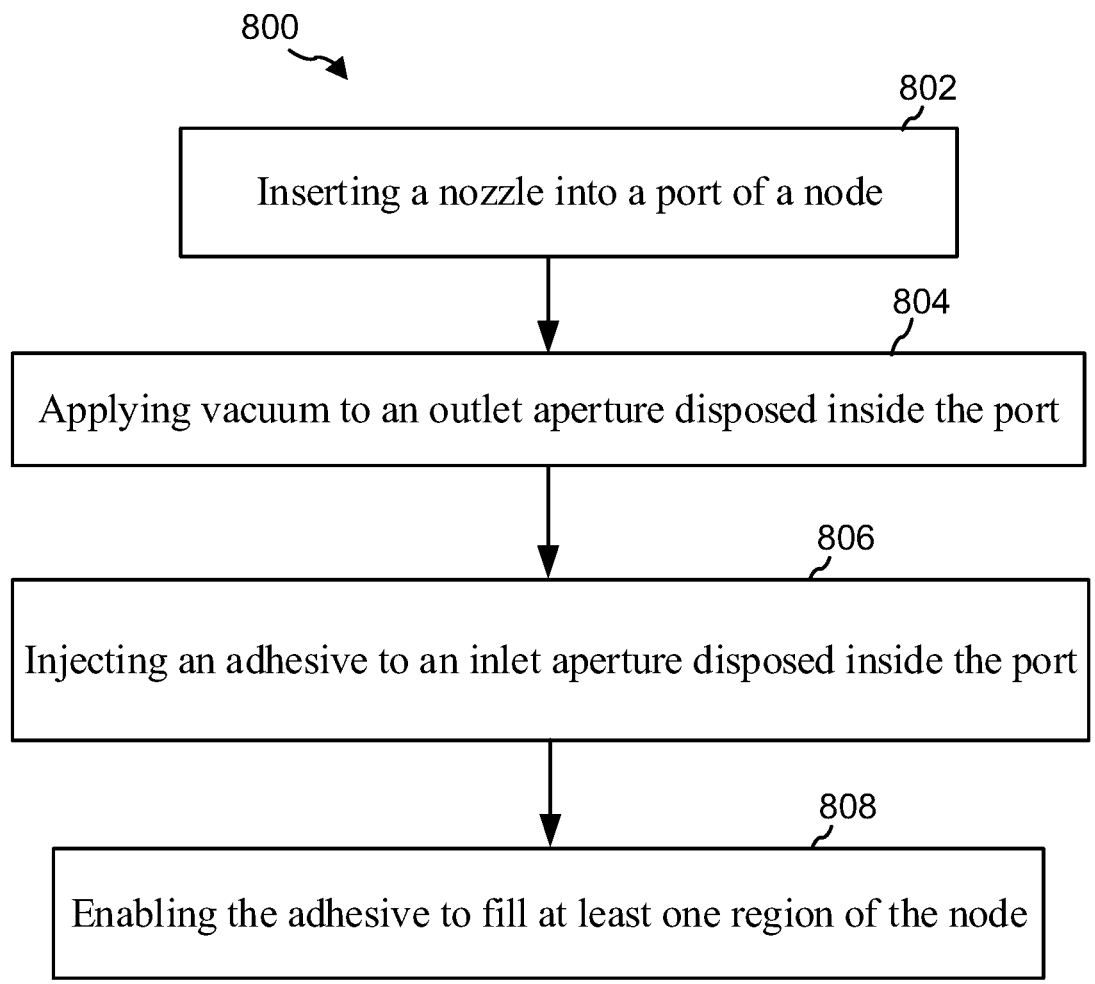
FIG. 8 is a flow diagram of an example method of using a single port node.

FIG. 8 is a flow diagram of an exemplary method 800 of using a single port node to form a bond with various components. Various embodiments of the method 800 of using the single port node are disclosed herein. When in use, a nozzle (also referred as an interface nozzle) can be inserted into the single port of the node. The step of inserting the nozzle into the port of the node 802 can be performed by a robot or other automated machinery for volume production. The step 802, of inserting a nozzle into a port of a node, can also be performed by a human. For example, an effector of the robot can grab an effector end of the nozzle and insert a port end of the nozzle into the port. The nozzle can include a plurality of channels. An outlet of nozzle of a vacuum channel, which may be a second channel of the nozzle, can be connected to a corresponding outlet aperture disposed inside the port. The step of applying vacuum 804 includes applying vacuum to the outlet aperture disposed inside the port.

In some embodiments, a step of applying vacuum 804 is used to draw the nozzle close to the port and lock the nozzle to the port. The negative pressure of vacuum may also help to speed up the process of filling the node with adhesive, e.g., by a robot sensing the presence of an output adhesive flow from the port in the second channel. For example, the step of applying vacuum 804 may include applying vacuum to the outlet aperture along an axial direction of the port. The outlet aperture may be disposed on a bottom of the port.

Thus, the negative pressure is applied along the axial direction of the port. In some other embodiments, the adhesive is removed without applying vacuum. The step of applying vacuum 804 may be omitted.

The method of using the single port node 800 includes a step of injecting the adhesive 806. An outlet of nozzle of an adhesive injection channel, which is a first channel of the nozzle, can be connected an inlet aperture disposed inside the port. The step of injecting the adhesive 806 includes injecting the adhesive to the inlet aperture disposed inside the port. For example, the inlet aperture may be disposed on a side wall of the port. Thus, the positive injection pressure is applied perpendicular to an axial direction of the port. In other words, the positive injection pressure is acting radially. Therefore, the positive pressure will not push the nozzle out of the port. In some embodiments, the step of injecting the adhesive 806 includes injecting the adhesive with the positive pressure perpendicular to the axial direction of the port.

The method 800 may further include enabling the adhesive to fill at least one region of the node 808. After the adhesive is injected, the adhesive can travel through a channel inside the node. The channel extends from the inlet aperture inside the port, to one or more one adhesive regions to be filled with the adhesive, and returns to the outlet aperture disposed inside the port. The method 800 can enable the adhesive to fill the one or more adhesive regions in the node to form bonds with various components. In some embodiments, the method 800 may further include removing the adhesive from the outlet aperture through the second channel of the nozzle. The process of removing the adhesive can be performed by applying the vacuum pressure, or can be performed without applying the vacuum.

The method 800 may further include dispensing another fluid, for example, a sealant or sealer, to encapsulate the injected adhesive inside the port through a third channel of the nozzle, which may be a sealant channel. For example, when the first traces of adhesive overflow are sensed in the second channel, the robot may be enabled to sense when to stop the adhesive flow in an embodiment. For example, after the injection and removal of the excessive adhesive, the sealant or sealer can be dispensed from one or more sealant outlets of the nozzle. The sealant or sealer may form a cap to encapsulate the injected adhesive. The sealant or sealer may be dispensed before the adhesive is cured. The sealant or sealer may be cured before the adhesive is cured. For example, the sealant or sealer sealant cures quicker than the adhesive. Thus, the sealant or sealer may protect the port and the process of curing the adhesive. The sealant or sealer may be dispensed from a plurality of third outlets such that the sealant or sealer may be evenly distributed and form a uniform layer of cap.

In some embodiments, the method 800 may further include separating the apertures of the nozzle by one or more O-rings of the nozzle. The nozzle may include one or more O-rings at a nozzle-port interface, and a nozzle-effector interface. The O-rings of the nozzle can separate the different channels, and prevent unwanted flow between channels. The O-rings may also help applying the vacuum. In the case that multiple circuits are actuated to apply the adhesive, vacuum and sealant, the O-rings may also help to prevent a short circuit (e.g., a breach of adhesive from an adhesive inlet channel into a vacuum channel, etc.).

Advantageously, the method 800 disclosed herein can significantly increase the efficiency of the manufacturing process. The complexity of the adhesive injection system can be reduced because the robot only needs to move to one location to inject the adhesive and sense a complete fill of the adhesive, with or without using negative pressure. Since the robots or other automated machines only have to interface with one port, these robots/machines can be made leaner and more compact than those in the conventional assembly system needed for applying adhesive to nodes requiring two (or more) ports. Because the assembly system involves a large number of nodes, the method 800 can greatly increase the efficiency and reduce the complexity of the assembly process.

In another aspect of this disclosure, a node for enabling connection of various components without an outlet aperture is disclosed. The node may include a port extending inwardly from a surface to form a recess. The node may further include an inlet aperture disposed inside the port. The inlet aperture is configured to receive a fluid injected into at least one bond region to be filled by the fluid. The port is configured to receive a nozzle to enable injection of the fluid. For example, the fluid can be an adhesive configured to bond various components together. In an embodiment, at least one connection of the node may be a part of a vehicle chassis. In another embodiment, at least one connection of the node may be a part of other structures.

Figure 9A:
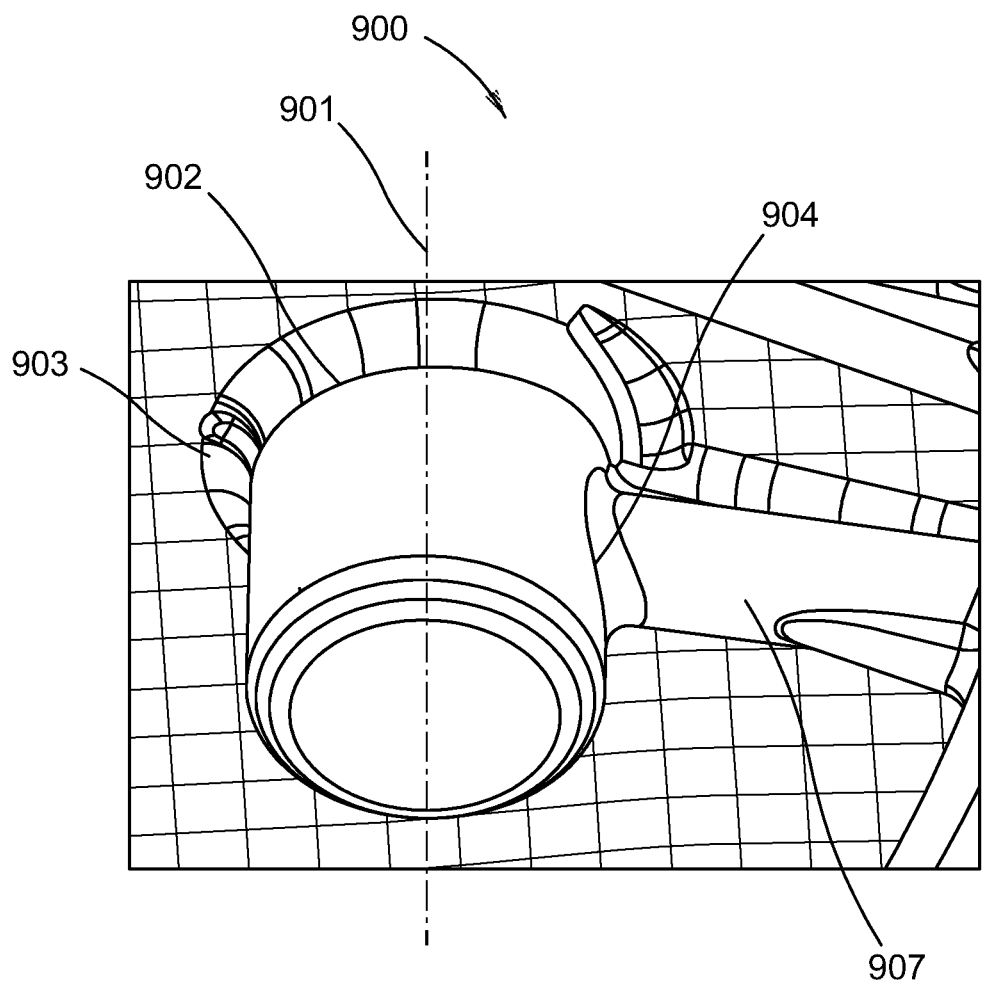
FIG. 9A illustrates a perspective view of an example of a single port node for bonding to various components.
Figure 9B:
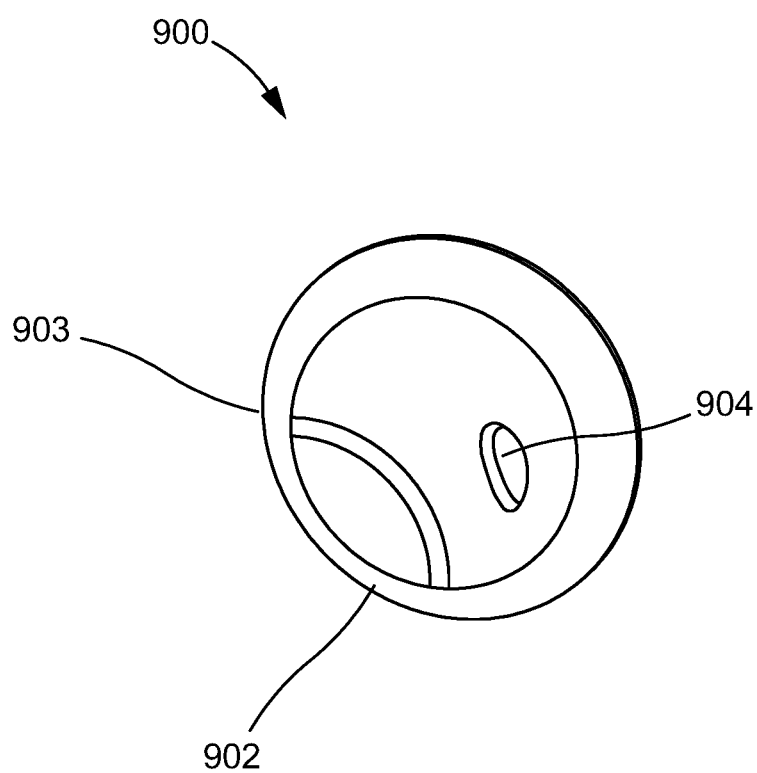
FIG. 9B illustrates a top view of the single port node in FIG. 9A.
Figure 9C:
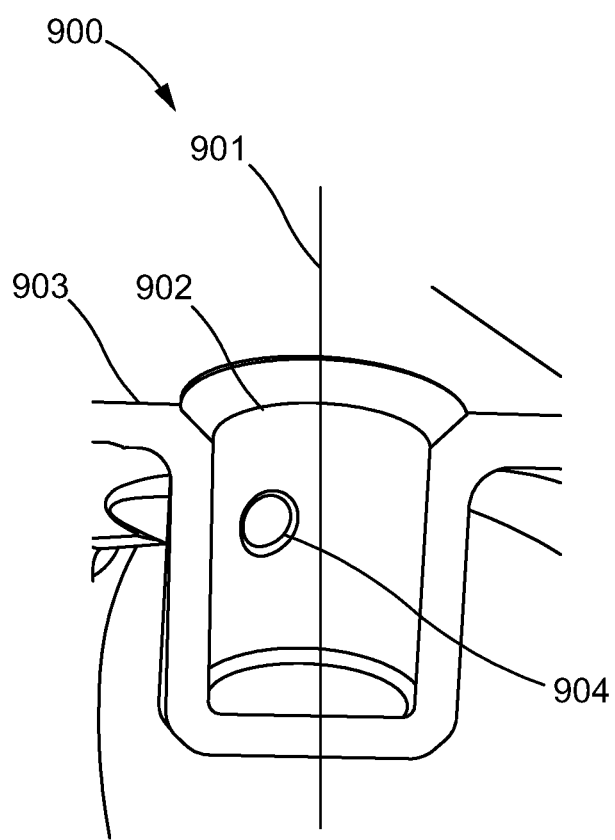
FIG. 9C illustrates another perspective view of the single port node in FIG. 9A.

FIG. 9A illustrates a perspective view of an example of a single port node 900 for bonding to various components according to another embodiment of this disclosure. FIG. 9B illustrates a top view of the single port node 900. FIG. 9C illustrates another perspective view of the single port node 900. Referring to FIGS. 9A-9C, the node 900 can include a port 902, and an inlet aperture 904. For example, the port 902 may extend inwardly from an external surface 903 to form a recess. The inlet aperture 904 is disposed inside the port 902 and configured to receive a fluid injected into at least one bond region to be filled by the fluid. For example, node 900 may be part of a node/panel interface, and the fluid may be an adhesive configured to bond node 900 to the panel using at least one adhesive bond region. The port 902 is configured to receive a nozzle to enable injection of the fluid. Adhesive is used below as an example in this disclosure for the fluid, however, the fluid can be any other fluid as well.

The single port 902 may be utilized for the adhesive inlet operations. The port 902 may be similar as the port 402, as shown in FIG. 4. For example, the port 902 may be in a cylindrical shape and extend in an axial direction in some embodiments. In some other embodiments, the port can be in a conical shape, a cubic shape, or any other shape. In some alternative embodiments, the port may be a protrusion extending upwardly from the external surface 903 with a recess in a central portion of the protrusion that includes the apertures or other structures. The ports may also include protrusions built within recesses in the node, such that the tips of the protrusions may be flush with or proximate in height to the external surface of the node in which the recesses are inset. In other embodiments, the protrusions may be higher or lower than the external surface. In embodiments utilizing protruding ports, the ports may optionally be fabricated with the intent of being broken off upon completion of the bonding process, which may also reduce mass and volume of the corresponding node or other structure that includes the ports. The port may have other configurations as well.

The apertures 904 may be disposed inside the port 902. The adhesive inlet aperture 904 is configured for receiving adhesive injected into the channel 907 and toward the adhesive regions. The aperture 907 may be similar to the aperture 407, as shown in FIG. 4. For example, the inlet aperture 904 may be disposed on a side wall of the port 902.

Thus, the adhesive is injected into the channel 907 by a positive pressure perpendicular to an axial direction 901 of the port 902. The injection pressure may push the effector or applicator for injecting the adhesive out of the port when the adhesive is injected along the axial direction 901 of the port 902. In some embodiments, the node 900 may further include a plurality of inlet apertures disposed inside the port 902. For example, the plurality of inlet apertures may be disposed circumferentially around the port 902. There are many variations and configurations of the location and arrangement of the inlet aperture 904. The above examples are for illustration only and are not intended to limit the scope of the disclosure. In some embodiments, the inlet and outlet apertures 904 may have a diameter of 1 mm or greater, although smaller values are possible and may be equally suitable in some embodiments. For example, the inlet 904 may have a diameter between 1 mm and 30 mm in an embodiment. The port 902 may have a cylindrical shape or any other shape. The inlet aperture may have any suitable shape as noted. The port may also include any other shape, such as a cubic shape, a conical shape, or any arbitrary shape.

The node 900 may further include at least one channel 907 extending from the adhesive inlet aperture 904 to the at least one adhesive region (not shown). The port 902 is coupled to the channel 907 through the adhesive inlet aperture 904. In other embodiments, adhesive inlet aperture 904 may comprise more than one aperture and may receive injected adhesive in parallel. The channel 907 may be similar to the channel 407 as shown in FIG. 4. For example, the inlet aperture 904 may in these embodiments comprise a plurality of inlet apertures disposed along a designated circumference of the cylindrical region of the port. These one or more apertures 904 may correspond to one or more channels 907 for delivering adhesive. In still other embodiments, as noted above, each of the one or more apertures and/or channels may include a variety of geometries, as suitable for the application.

The channel 907 may be a part of the node 900 and may be additively manufactured using any suitable AM technique. The channel 907 may comprise multiple channel portions after it enters and then exits an adhesive bond region. Depending on the embodiment and whether adhesive is injected serially or in parallel, the node may be considered to have one or more channels as described above. In general, the design of the channels may enable sequential flow of the adhesive into specific adhesive bond regions between an inner surface of the node and an outer surface of a component whose edge has been inserted into a recess of the node.

A plurality of nozzles, or interface nozzles, may be utilized with the node 900 having a single port for adhesive as described above. For example, the nozzle may include a first channel comprising a first inlet of nozzle and a first outlet of nozzle. The first outlet of nozzle may be configured to be coupled to the inlet aperture 904 disposed inside the port 902 of the node 900. Similar to the nozzle 500, as shown in FIGS. 5A and 5B, the nozzle for the single port 902 may include a first end and a second end. The first end may also referred to as a port end, which is configured to be inserted into the port 902. The port end of the nozzle may have a size compatible with a diameter of the port 902. The second end may be also referred to as an effector end, which is configured to be coupled to an effector.

In an exemplary embodiment, the adhesive is injected into the inlet aperture 904 with a positive pressure perpendicular to the axial direction 901 of the port 902. For example, the first outlet of nozzle is disposed on a side wall of the port end. The pressure from the injection of the adhesive acts radially in the nozzle and port 902. That is, the injection of the adhesive causes a force applied on the nozzle along a radial direction. The force from the injection is perpendicular to the axial direction 901 of the port 902. Thus, the force neither pulls nor pushes the nozzle in or out of the receptacle port 902 during the adhesive injection process. This configuration is advantageous to form a stable connection between the nozzle and the node 900, as discussed above.

Figure 10:
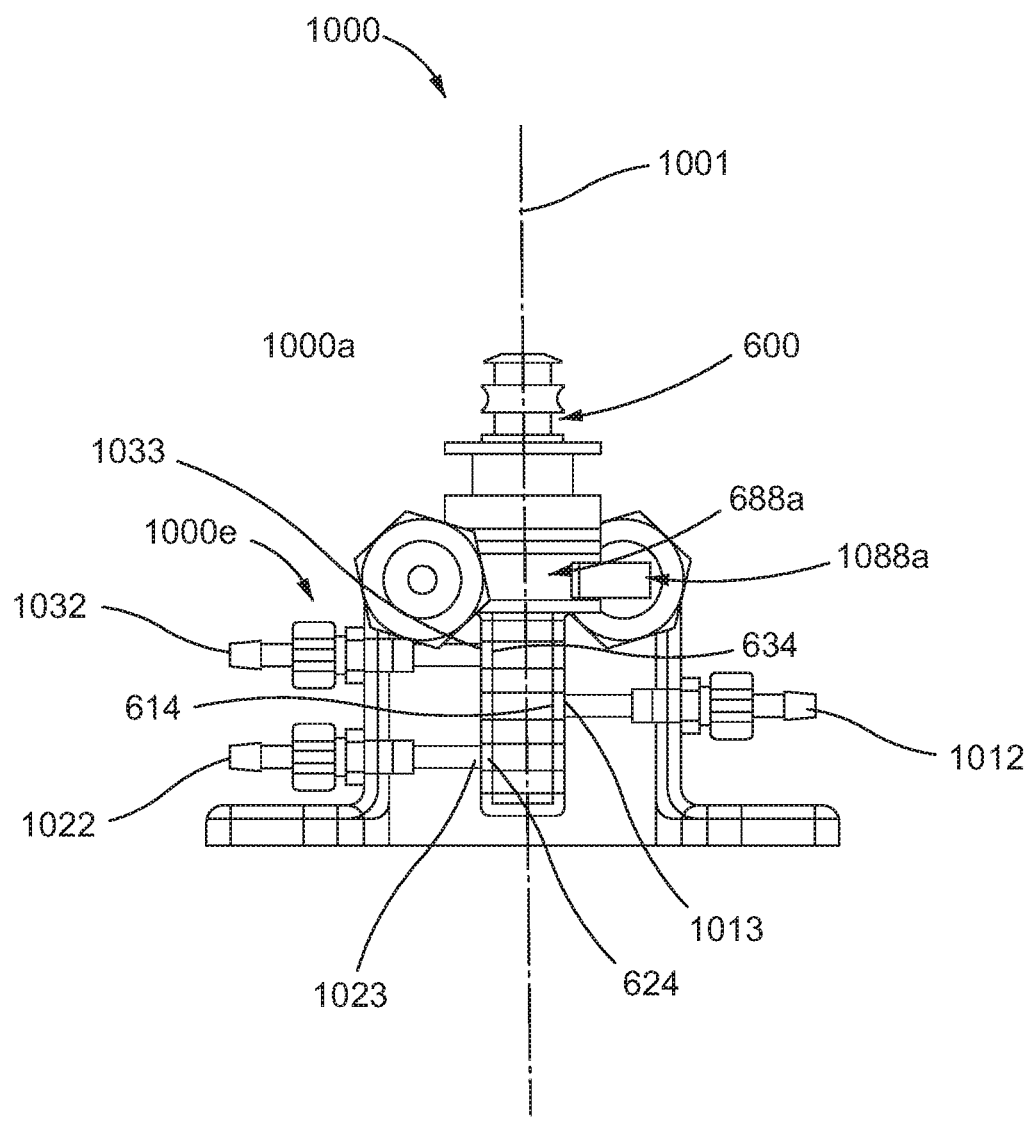
FIG. 10 illustrates a side view of an example of an end effector for interfacing with a nozzle according to one embodiment of this disclosure.
Figure 11A:
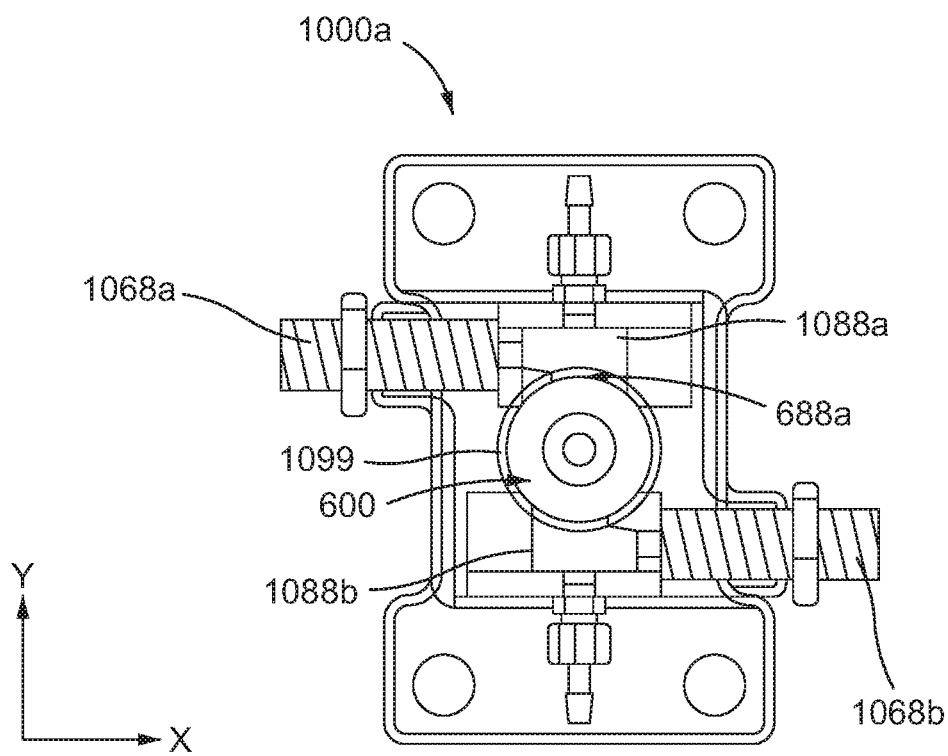
FIG. 11A illustrates a top view of the end effector in FIG. 10 in a first position.
Figure 11B:
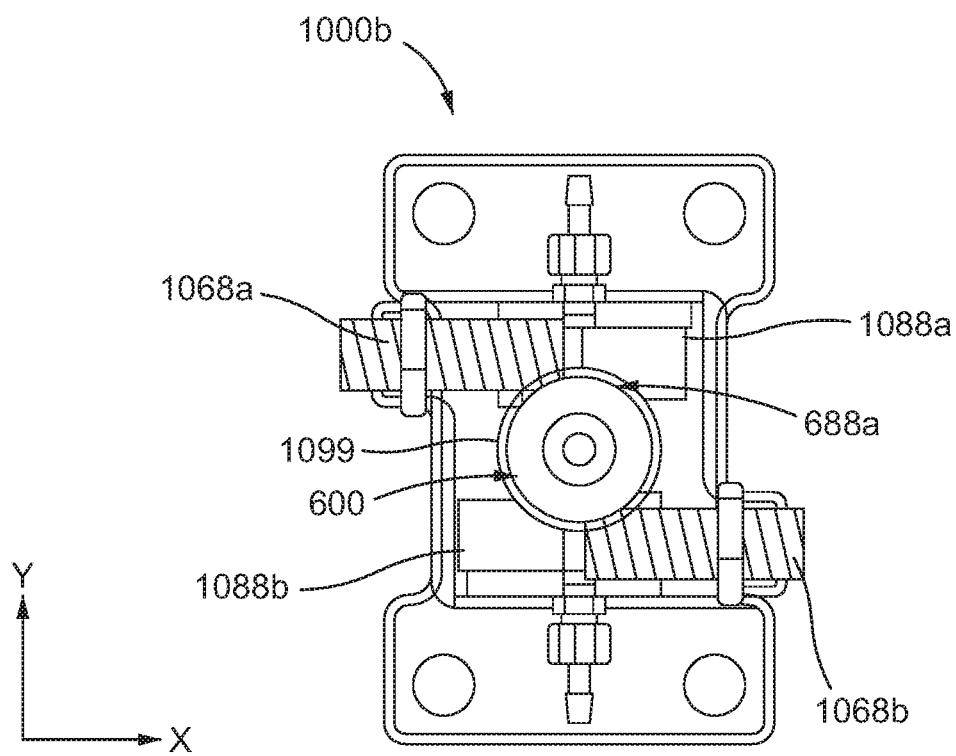
FIG. 11B illustrates another top view of the end effector in FIG. 10 in a second position.
Figure 12:
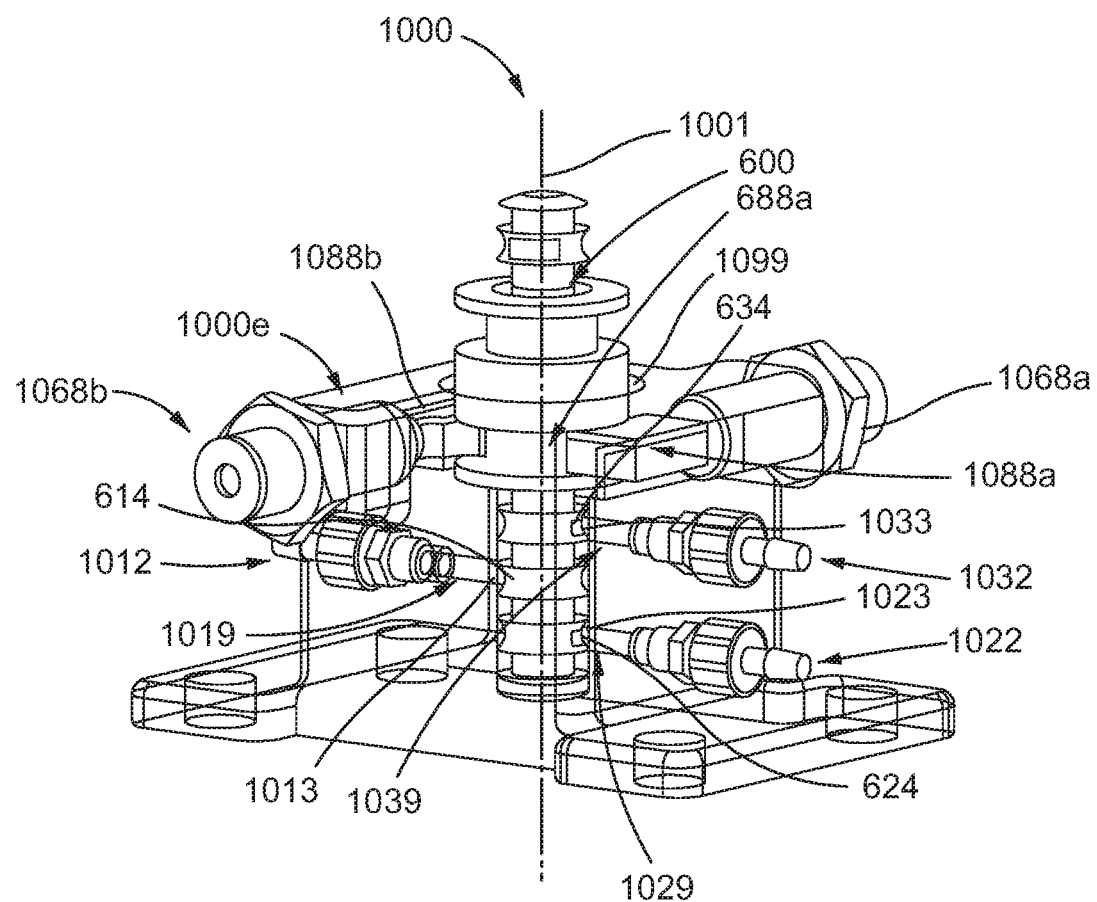
FIG. 12 illustrates a perspective view of the end effector in FIG. 10.

FIG. 10 illustrates a side view of an example of an end effector 1000 for interfacing with a nozzle (e.g., the nozzle 600 in FIGS. 6A-6B, the nozzle 500 in FIGS. 5A-5B) according to one embodiment of this disclosure. FIG. 11A illustrates a top view of the end effector 1000 in a first position 1000a. FIG. 11B illustrates another top view of the end effector 1000 in a second position 1000b. FIG. 12 illustrates a perspective view of the end effector 1000.

In an aspect of the disclosure, the end effector 1000 for interfacing with a nozzle (e.g., 500, 600) is disclosed. The end effector 1000 may comprise a first end 1000e, which includes a receptacle 1099 (FIGS. 11A-B, 12). The receptacle 1099 in this embodiment is a downward protrusion having a generally circular opening at the first end 1000e and cylindrically-shaped side walls that are configured to receive the nozzle 600 and sized to the body of the nozzle 600 at the effector end. The side walls may include inlets and outlets for enabling fluids or negative pressure to flow between the end effector 100 and nozzle 600. A variety of receptacle shapes are possible, including shapes for accommodating non-cylindrical nozzles. The nozzle 600 may include one or more nozzle retention features (e.g., 688a) and a first nozzle inlet (e.g. 614). The nozzle 600 is used as only an example of nozzles for illustration in FIGS. 10-12 in this disclosure. However, the end effector 1000 can be used to interface with a variety of nozzles, not being limited to the nozzle 600.

Referring to FIGS. 10-12, the end effector 1000 may comprise one or more retention features (e.g., 1088a, 1088b) positioned along a perimeter of the receptacle 1099, where each of the one or more retention features (e.g., 1088a, 1088b) is movable between a first position 1000a and a second position 1000b. Each of the one or more retention features (e.g., 1088a, 1088b) is configured to lock the nozzle 600 by securing onto a corresponding one of the one or more nozzle retention features (e.g., 688a) in the first position, and to release the nozzle 600 in the second position 1000b. The end effector 1000 may further comprise one or more actuators, for example, 1068a and 1068b, configured to actuate the one or more retention features (e.g., 1088a, 1088b) between the first position 1000a and the second position 1000b. The end effector 1000 comprises a first channel 1019 (FIG. 12), which includes a first inlet 1012 and a first outlet 1013. The first outlet 1013 is positioned inside the receptacle 1099 and is configured to be coupled to the first nozzle inlet 614 in the first position 1000a.

As shown in FIG. 10, the end effector 1000 is configured to connect to the nozzle 600, for example, a multi-channel adhesive nozzle. The end effector 1000 is the component that may connect to an effector end 600a of the nozzle 600. The end effector 1000 may include feed ports that may be coupled to the inlet ports of the nozzle 600. For example, the end effector 1000 may include a first inlet port 1012 connected to a first outlet 1013, and further coupled to a first inlet port 614 (e.g., adhesive port) of the nozzle 600. The end effector 1000 may include a second inlet port 1022 connected to a second outlet 1023, and further coupled to a second inlet port 624 (e.g., vacuum port) of the nozzle 600. The end effector 1000 may include a third inlet port 1032 connected to a third outlet 1033, and further coupled to a third inlet port 634 (e.g., sealant port) of the nozzle 600. The inlet ports and outlet ports may have other configurations, depending on the requirements. The end effector 1000 thus has the capability to inject or apply a variety of fluids at the same time.

As shown in FIGS. 11A-B, the end effector 1000 may include a receptacle 1099 to receive the nozzle 600. The end effector 1000 may include one or more retention features 1088a and 1088b, to retain the nozzle 600 to the end effector 1000 during the injection process. One or more corresponding retention features 688a may be present on the nozzle 600. For example, the one or more retention features 1088a, 1088b in the end effector 1000 may include cleats, or tangs, or protrusions, or tabs, or projections that can lock into the one or more corresponding retention feature 688a on the nozzle 600 in a first position 1000a (FIG. 11A) and can thus lock the end effector 1000 to the nozzle 600 such that the fluid or vacuum application operations described herein can be initiated. Once these operations are completed, end effector 1000 can be released from the nozzle 600 by moving retention features 1088a, 1088b into a second position 1000b (FIG. 11B) as described in further detail below.

In some aspects, one or more actuators 1068a, 1068b may be utilized to lock and release the nozzle 600 by actuating the one or more retention features 1088a and 1088b. For example, the one or more actuator 1068a, 1068b may be hydraulically actuated, pneumatically actuated, electrically actuated, and the like. In an embodiment, the one or more actuators comprises one or more pneumatic cylinders, as shown in FIGS. 11A-B.

FIG. 11A illustrates the end effector 1000 in a first position 1000a, when the one or more pneumatic cylinders 1068a, 1068b are actuating the cleats 1088a, 1088b to an extended (locking the nozzle) position. As shown in FIG. 11A, the one or more retention features 1088a, 1088b may be positioned along a perimeter of the receptacle 1099. For example, the one or more retention features 1088a, 1088b in the end effector 1000 may include cleats, or tangs, or protrusions, or tabs, or projections, etc. Each of the one or more retention features 1088a, 1088b may be movable between the first position 1000a which is a locked position, and a second position 1000b which is a retracted position. Each of the one or more retention features 1088a, 1088b may be configured to lock the nozzle 600 by securing onto a corresponding one of the one or more nozzles 600 in the first position 1000a.

The end effector 1000 can then be released from the nozzle 600 when operations are complete. For example, the one or more retention features 688a may be locked in the first position 1000a by their respective actuators 1068a, 1068b when fluid application and related procedures are ongoing. Upon completion of the process, end effector 1000 may then be released into a retracted position by releasing the features 1088a, 1088b from nozzle 600 as describe below.

Various embodiments may be used in FIG. 11A for locking the end effector 1000 in place. In one example, the features 1088a, 1088b may be configured as cleats having curved edges and being movable along the X direction as shown in FIGS. 11A-11B. When the cleats 1088a, 1088b move along the X-direction, the curved edges of the cleats 1088a, 1088b may be placed to secure onto, or lock into, the one or more corresponding retention feature 688a, for example, a corresponding groove or one or more recesses on the nozzle 600. In another example, the one or more retention features 1088a, 1088b on the end effector 1000 may instead be configured to be movable along the Y direction, and may be placed to secure onto, or lock into the one or more corresponding retention feature on the nozzle when the retention features are moved along the Y direction. In another example, the one or more retention features 1088a, 1088b may be tabs, or tongs that are movably attached to the receptacle and that can be moved into the one or more corresponding retention features 688a, 688b of the nozzle 600 to lock the end effector in place. In another example, the one or more retention features can be movable in any directions and can move anywhere on the X-Y plane.

FIG. 11B illustrates the end effector 1000 in a second position 1000b, when the one or more pneumatic cylinders 1068a, 1068b are actuating the cleats 1088a, 1088b to a retracted position. As shown in FIG. 11B, the one or more retention features 1088a, 1088b may be moved away from the one or more corresponding retention features 688a on the nozzle 600 to release the nozzle 600 from the end effector 1000.

In some other embodiments, the one or more retention features of the end effector may be grooves or one or more recesses, and the one or more corresponding retention features on the nozzle may be cleats, or tangs, or protrusions, or tabs, or projections, etc.

In some embodiments as described above, one or more actuators 1068a, 1068b can be configured to actuate the one or more retention features 1088a, 1088b between the first position 1000a, and the second position 1000b. The one or more actuators 1068a, 1068b may comprise hydraulic actuators, pneumatic actuators, electronic actuators, or other types of actuators. In an alternative embodiment, the one or more retention features 1088a, 1088b may be actuated manually.

As shown in FIG. 12, the end effector 1000 may include the receptacle 1099 to accommodate the nozzle 600. The nozzle 600 may have an effector end, and the receptacle 1099 may have a size compatible with a size of the effector end of the nozzle 600 to enable the effector end to fit into the receptacle 1099. The end effector 1000 may comprise a first channel 1019, which includes a first inlet 1012 and a first outlet 1013. The end effector 1000 may further comprise a second channel 1029, which includes a second inlet 1022 and a second outlet 1023. The end effector 1000 may further comprise a third channel 1039, which includes a third inlet 1032 and a third outlet 1033. The first outlet 1013, the second outlet 1023, the third outlet 1033 may be positioned inside the receptacle 1099 and are configured to be coupled to the first nozzle inlet 614, the second nozzle inlet 624, the third nozzle inlet 634 respectively, in the first position 1000a. The end effector 1000 may further comprise an exterior surface, where the first inlet 1012, the second inlet 1022, the third inlet 1032 may be positioned on the exterior surface of the end effector 1000.

Once the nozzle 600 is locked into place, the first channel 1019, the second channel 1029 and the third channel 1039 can line up with the respective first inlet 614, second inlet 624, and third inlet 634 on the nozzle 600. The nozzle 600 may further include O-Rings to ensure that the volume between the outlets (e.g., 1013, 1023, 1033) of the channels (e.g., 1019, 1029, 1039) in the end effector 1000 and the corresponding nozzle inlets (e.g., 614, 624, 634) on the nozzle 600 are isolated from other inlet and outlet pairs.

For example, when an adhesive inlet, a vacuum inlet and a sealant inlet are utilized, the end effector 1000 may have three inlet and outlet pairs. The adhesive inlet 1012, the vacuum inlet 1022 and the sealant inlet 1032 may be disposed on an exterior surface of the end effector 1000. The adhesive inlet 1012, the vacuum inlet 1022 and the sealant inlet 1032 may be connected to the corresponding outlets 1013, 1023, and 1033 through isolated channels 1019, 1029, and 1039, as shown in FIG. 12.

For example, the first channel 1019 may be configured to enable injection of a first fluid (e.g., adhesive). For example, the second channel 1029 may be configured to facilitate removing the first fluid (e.g., adhesive) from the nozzle 600. For another example, the second inlet 1022 of the second channel 1029 may be configured to be coupled to a negative pressure source to apply vacuum to the second nozzle inlet 624. For another example, the second channel 1029 may also be used for a positive pressure to expel a fluid drawn into a vacuum aperture (e.g., 624) during a vacuum operation. For example, the third channel 1039 may be configured to dispense a second fluid through the third outlet 1033 to the third nozzle inlet 634. The third channel 1039 may be configured to dispense a sealant through the third outlet 1033 to the third nozzle inlet 634 in some embodiments.

For example, fluids may be configured to be injected from the inlets 1012, 1022, and 1032, to enter the channels 1019, 1029, and 1039, to exit through the outlets 1013, 1023 and 1033 radially, which is perpendicular to an axial direction 1001 of the end effector 1000. The fluids exiting the channels (e.g., 1019, 1029, 1039) may be configured to enter the nozzle inlets (e.g., 614, 624, 634) of the nozzle 600 radially, which is perpendicular to an axial direction of the nozzle 600. For example, the receptacle 1099 may include a side wall, and where the first outlet 1013 may be disposed on the side wall to enable a first fluid to be injected into the first nozzle inlet 614 with a positive pressure perpendicular to an axial direction of the nozzle 600. This can ensure that the pressure from the injection of the fluids, for example, the adhesive/sealant injection, acts radially or perpendicular to an axial direction of the nozzle 600, thereby preventing displacement of the nozzle 600 during the fluid injection process. For example, the outlets (e.g., 1013, 1023, 1033) may be disposed to enable another fluid to be injected into the corresponding nozzle inlets (e.g., 614, 624, 634) radially.

The sizes and profiles of inlets (e.g., 1012, 1022, 1032), the outlet (e.g., 1013, 1023, 1033) and the channels (e.g., 1019, 1029, 1039) can be a function of the viscosities of the fluids being transported through the end effector 1000. More viscous fluids may require greater diameters of the channels (e.g., 1019, 1029, 1039), the inlets (e.g., 1012, 1022, 1032), and the outlets (e.g., 1013, 1023, 1033). For example, the channels can have a cross section in a circular shape, an elliptical shape, a rectangular shape, or any other shape. For example, a diameter of the third channel 1039 can be larger than a diameter of the first channel 1019. For example, the diameter of the inlet 1032 for the sealant may be larger than the inlet 1012 for the adhesive, in one embodiment. The nozzle 600 may further include O-Rings to isolate different channels (e.g., 1019, 1029, 1039). The fluids can be transferred through the isolated channels (e.g., 1019, 1029, 1039) provided in the end effector 1000. This can ensure multiple fluids to be transferred simultaneously without mixing.

The end effector 1000 may further comprise a second end. In some aspects, the second end is configured to be coupled to a robot and the end effector may be manipulated by a robot. The robot may provide the actuators for manipulating the movements of the end effector 1000, for providing the necessary pneumatic pressure for actuating the locking and unlocking mechanisms of the end effector 1000 to the nozzle, as well as tubes or channels coupled to the necessary fluid storage and vacuum pump equipment for coupling to the necessary inlets and outlets that lead to the nozzle 600,via the receptacle connections, and ultimately to the node via the port in which the nozzle 600 is inserted. In some other aspects, the second end of the end effector may be grabbed by a person, and the end effector may be manipulated by a person.

In various embodiments, the one or more actuators 1068a, 1068b may be co-printed with the one or more retention features 1088a, 1088b, and may be further co-printed with the receptacle 1099 of the end effector 1000 in the AM process. For example, the entire end effector 1000 is an additively manufactured end effector. The receptacle 1099, the inlets (e.g., 1012, 1022, 1032), the outlets (e.g., 1013, 1023, 103), the channels (e.g., 1019, 1029, 1039), the one or more retention features (e.g., 1088a, 1088b), the one or more actuators (e.g., 1068a, 1068b), of the end effector 100 are co-printed and produced by the AM process.

Figure 13:
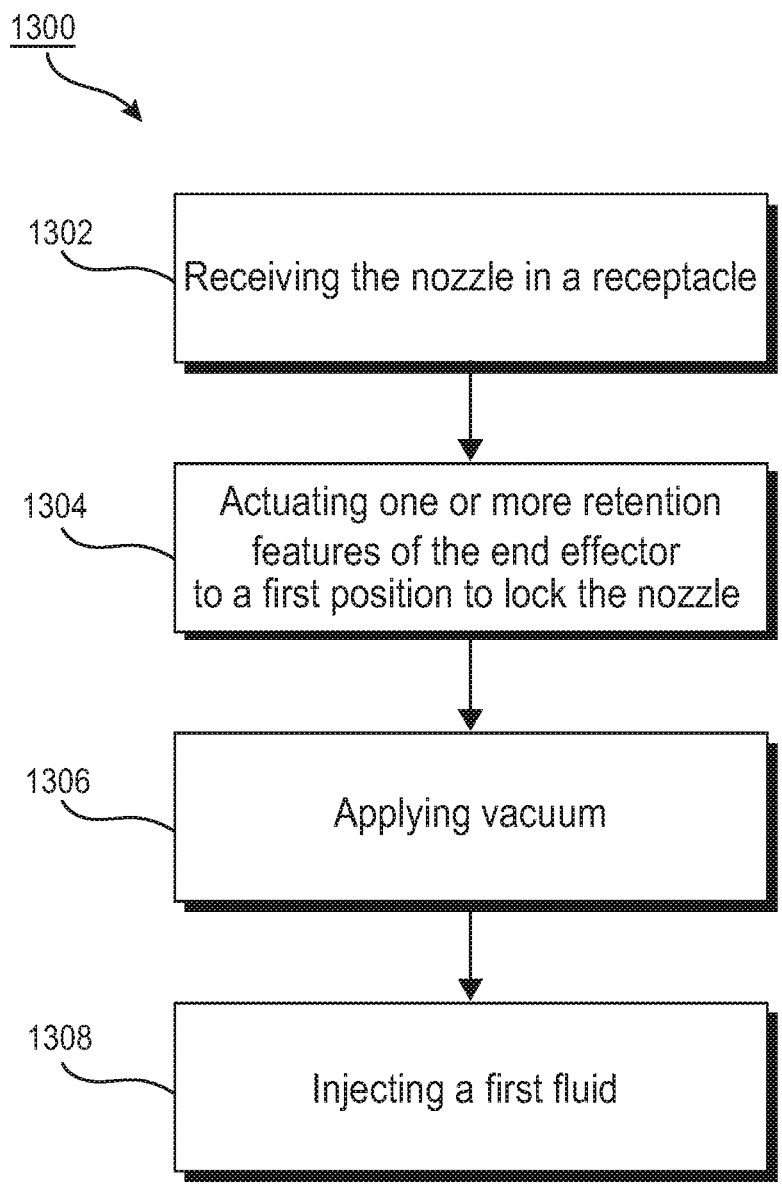
FIG. 13 is a flow diagram of an example method of using an end effector to interface with a nozzle.

FIG. 13 is a flow diagram of an example method 1300 of using an end effector to interface with a nozzle. The method 1300 comprises receiving the nozzle in a receptacle of the end effector, as illustrated at 1302. The method comprises actuating one or more retention features of the end effector to a first position to secure onto a corresponding one of one or more nozzle retention features to lock the nozzle, as illustrated at 1304.

As illustrated at 1306, the method 1300 may comprise applying vacuum to a second inlet of the end effector, where a second outlet of the end effector is coupled to a second nozzle inlet.

As illustrated at 1308, the method 1300 comprises injecting a first fluid to a first inlet of the end effector, where a first outlet of the end effector is coupled to a first nozzle inlet.

For example, injecting an adhesive may comprise injecting the adhesive into the first nozzle inlet with a positive pressure perpendicular to an axial direction of the nozzle.

For another example, injecting an adhesive may comprise injecting the adhesive into the first nozzle inlet radially.

For another example, the method 1300 may further comprise removing the adhesive from the second outlet.

For another example, the method 1300 may further comprise dispensing another fluid to a third inlet of the end effector, wherein a third outlet of the end effector is coupled to a third nozzle inlet.

For example, dispensing another fluid may comprise dispensing a sealant. In other embodiments, the fluid may alternatively or additionally be a different type other than an adhesive or sealant, such as a lubricant.

For example, dispensing another fluid may comprise dispensing the another fluid into the third inlet of nozzle with a positive pressure perpendicular to an axial direction of the nozzle.

For example, dispensing another fluid may comprise dispensing the another fluid into the third inlet of nozzle radially.

For another example, the method 1300 may further comprise coupling the end effector to a robot.

For example, the method 1300 may be performed by a robot. For example, the method 1300 may be performed by a person.

For another example, the method 1300 may further comprise, after the nozzle is installed in the end effector, performing additional fluid applications and vacuum operations by using the same nozzle.

For another example, the method 1300 may further comprise, applying a positive pressure to a second inlet of the end effector, where a second outlet of the end effector is coupled to a second nozzle inlet. For example, a second channel, a vacuum channel, may also be used for a positive pressure to expel a fluid drawn into a vacuum aperture during a vacuum operation.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), or analogous law in applicable jurisdictions, unless the element is expressly recited using the phrase "means for" or, in the case of a method claim, the element is recited using the phrase "step for."

What is claimed is:

1. A system comprising:
   a nozzle, the nozzle including:
   an effector end;
   a port end configured to be inserted into a port;
   one or more nozzle retention features;
   a first nozzle inlet;
   a plurality of regions configured for receiving a sealant, wherein at least one of the plurality of regions includes a joining feature on a surface of the nozzle, and the effector end and the port end each include at least one of the plurality of regions configured for receiving the sealant; and
   an end effector, the end effector including:
   a first end comprising a receptacle, the receptacle being connected to the effector end of the nozzle;
   one or more retention features positioned along a perimeter of the receptacle, each of the one or more retention features being movable between a first position and a second position, each of the one or more retention features being configured to lock the nozzle by securing onto a corresponding one of the one or more nozzle retention features in the first position, and to release the nozzle in the second position;
   one or more actuators configured to actuate the one or more retention features between the first position and the second position; and
   a first channel comprising a first inlet and a first outlet, the first outlet being positioned inside the receptacle and being configured to be coupled to the first nozzle inlet in the first position.

2. The system of claim 1, wherein the one or more nozzle retention features comprises a groove, and wherein the one or more retention features comprises one or more cleats.

3. The system of claim 1, wherein the one or more nozzle retention features comprise one or more recesses, and wherein the one or more retention features comprise one or more protrusions.

4. The system of claim 1, wherein the one or more actuators include one or more pneumatic actuators.

5. The system of claim 4, wherein the one or more pneumatic actuators include one or more pneumatic cylinders.

6. The system of claim 1, wherein the one or more actuators include one or more hydraulic actuators.

7. The system of claim 1, wherein the one or more actuators include one or more electrical actuators.

8. The system of claim 1, wherein the end effector further comprises an exterior surface, and wherein the first inlet is positioned on the exterior surface.

9. The system of claim 1, wherein the first channel is configured to inject a first fluid through the first outlet into the first nozzle inlet.

10. The system of claim 1, wherein the receptacle includes a side wall, and wherein the first outlet is disposed on the side wall to enable a first fluid to be injected into the first nozzle inlet with a positive pressure perpendicular to an axial direction of the nozzle.

11. The system of claim 1, wherein the first outlet is disposed to enable an adhesive to be injected into the first nozzle inlet radially.

12. The system of claim 1, wherein the end effector further comprises a second end, wherein the second end is configured to be coupled to a robot.

13. The system of claim 1, wherein the end effector further comprises a second channel, wherein the nozzle further comprises a second nozzle inlet, wherein the second channel comprises a second inlet and a second outlet, and wherein the second outlet is configured to be coupled to the second nozzle inlet in the first position.

14. The system of claim 13, wherein the second channel is configured to facilitate removing adhesive first fluid from the nozzle.

15. The system of claim 13, wherein the second inlet is configured to be coupled to a negative pressure source to apply vacuum to the second nozzle inlet.

16. The system of claim 13, wherein the end effector further comprises an exterior surface, and wherein the second inlet is positioned on the exterior surface.

17. The system of claim 13, wherein the first channel and the second channel are isolated from each other.

18. The system of claim 13, wherein the end effector further comprises a third channel, and wherein the nozzle further comprises a third nozzle inlet, wherein the third channel comprises a third inlet and a third outlet.

19. The system of claim 18, wherein the third outlet is configured to be coupled to the third nozzle inlet in the first position.

20. The system of claim 18, wherein the third channel is configured to dispense a sealant through the third outlet to the third nozzle inlet.

21. The system of claim 18, wherein the end effector further comprises an exterior surface, and wherein the third inlet is positioned on the exterior surface.

22. The system of claim 18, wherein the receptacle includes a side wall, and wherein the third outlet is disposed on the side wall to enable another fluid to be injected into the third nozzle inlet with a positive pressure perpendicular to an axial direction of the nozzle.

23. The system of claim 18, wherein the third outlet is disposed to enable a fluid to be injected into the third nozzle inlet radially.

24. The system of claim 18, wherein a diameter of the third channel is larger than a diameter of the first channel.

25. The system of claim 18, wherein the first channel, the second channel, and the third channel are isolated from each other.

26. The system of claim 1, wherein the end effector is additively manufactured.

27. A method of using an end effector to interface with a nozzle, the method comprising:
receiving the nozzle in a receptacle of the end effector;
actuating one or more retention features of the end effector to a first position to securing onto a corresponding one of one or more nozzle retention features to lock the nozzle;
applying vacuum to a second inlet of the end effector, wherein a second outlet of the end effector is coupled to a second nozzle inlet; and
injecting a first fluid to a first inlet of the end effector, wherein a first outlet of the end effector is coupled to a first nozzle inlet.

28. The method of claim 27, wherein the first fluid is an adhesive and the injecting comprises injecting the adhesive into the first nozzle inlet with a positive pressure perpendicular to an axial direction of the nozzle.

29. The method of claim 27, wherein the first fluid is an adhesive and the injecting comprises injecting the adhesive into the first nozzle inlet radially.

30. The method of claim 27, further comprising removing an adhesive from the second outlet.

31. The method of claim 27, further comprising dispensing another fluid to a third inlet of the end effector, wherein a third outlet of the end effector is coupled to a third nozzle inlet.

32. The method of claim 31, wherein dispensing another fluid comprises dispensing a sealant.

33. The method of claim 31, wherein dispensing another fluid comprises dispensing the another fluid into the third inlet of nozzle with a positive pressure perpendicular to an axial direction of the nozzle.

34. The method of claim 31, wherein dispensing another fluid comprises dispensing the another fluid into the third inlet of nozzle radially.

35. The method of claim 27, further comprising coupling the end effector to a robot.

36. The method of claim 27, wherein the method is performed by a robot.

* * * * *